(12) United States Patent
Boden et al.

(10) Patent No.: US 11,790,799 B2
(45) Date of Patent: Oct. 17, 2023

(54) STUDENT TRAINING SYSTEM FOR A VEHICLE SYSTEM

(71) Applicant: Consulab Educatech Inc., Quebec City (CA)

(72) Inventors: Kevin Curtiss Boden, Quebec City (CA); Nathan Lambert Banke, Quebec City (CA); Ricky Gerald Martineau, Black Diamond (CA); Guillaume Lemieux, Quebec City (CA); Marc Dore, Quebec City (CA)

(73) Assignee: Consulab Educatech Inc., Quebec City (CA)

( * ) Notice: Subject to any disclaimer, the term of this patent is extended or adjusted under 35 U.S.C. 154(b) by 298 days.

(21) Appl. No.: 17/194,445

(22) Filed: Mar. 8, 2021

(65) Prior Publication Data

US 2022/0284826 A1 Sep. 8, 2022

(51) Int. Cl.
 *G09B 9/04* (2006.01)
(52) U.S. Cl.
 CPC ..................... *G09B 9/04* (2013.01)
(58) Field of Classification Search
 CPC ........ G09B 9/00; G09B 19/00; G09B 19/003; F02D 2041/1437
 See application file for complete search history.

(56) References Cited

U.S. PATENT DOCUMENTS

| 3,899,916 | A | * | 8/1975 | Cline | G01L 5/225 |
| | | | | | 73/126 |
| 6,302,689 | B1 | * | 10/2001 | Mayo | A61C 9/0006 |
| | | | | | 433/37 |
| 2008/0269980 | A1 | * | 10/2008 | Spivak | F02D 41/221 |
| | | | | | 701/31.4 |
| 2009/0234556 | A1 | * | 9/2009 | Kang | F02D 13/0203 |
| | | | | | 701/102 |
| 2012/0082967 | A1 | * | 4/2012 | Stone | G09B 19/003 |
| | | | | | 434/219 |
| 2019/0304214 | A1 | * | 10/2019 | Mentele | G07C 5/0825 |

* cited by examiner

*Primary Examiner* — Robert J Utama
(74) *Attorney, Agent, or Firm* — John F. Buckert; Buckert Patent & Trademark Law Firm PC

(57) ABSTRACT

A student training system for a vehicle system is provided. The student training system has a primary computer that displays a first GUI having a first case study command button associated with a first case study. The first case study is a training assignment associated with a first operational problem in the vehicle system. The primary computer displays a second GUI having text that describes the first operational problem, and a start case study command button. The primary computer sends a first code to the intermediate microprocessor when the start case study command button is selected. The intermediate microprocessor generates a control signal in response to the code to induce a controllable switch to electrically de-couple a first device from the controller to induce the vehicle system to have the first operational problem.

15 Claims, 29 Drawing Sheets

☰ ⌂ Safety Warnings ⌘ Instructor Mode ⊙

322

EM-140S-GM04A_035023
ConsuLink Cruze 1.4L Engine trainer, AC & Stop-Start

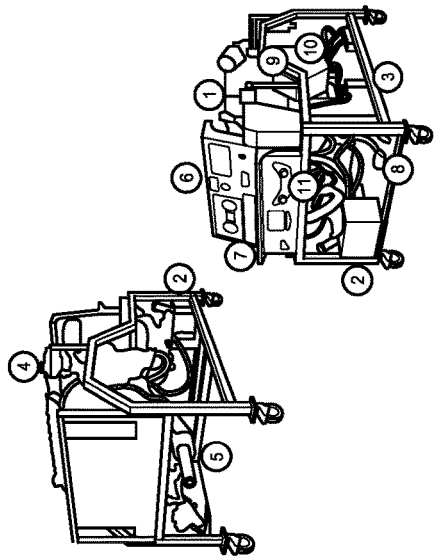

Definition of WARNING NOTE, and IMPORTANT

The diagnosis and repair procedures in our manuals contain both general and specific safety cautions titled: WARNING, NOTE, and IMPORTANT. Certain procedures may present a hazard to the technician if they are not followed in the recommended manner.
WARNING, NOTE, and IMPORTANT are elements designed to prevent these hazards, however not all hazards can be foreseen. This information is placed at strategic locations within the service manual and is designed to prevent the following from occurring:
- Serious bodily injury or death to the technician
- Damage to the equipment
- Unnecessary repairs WARNING defined:

When encountering a CAUTION, you will be asked to take a necessary action or not to take a prohibited action. If a CAUTION is not heeded, the following consequences may occur:
- Serious bodily injury or death to the technician
- Serious bodily injury or death to other technici

Case Studies - Instructor

The following case studies can be inserted and explored by you, the student. Follow the instructions indicated and perform your inspection and diagnosis accordingly.

- Engine Performance - Instructor's version
- AAT sensor lessons
- ECT sensor lessons
- MAP sensor lessons
- HO2S1 sensor lessons
- MAF sensor lessons
- APP sensor lessons

← CS01 - P0204

Scenario Number: 1125
Engine running rough (1)

Customer states engine is not running well, feels low on power and the check engine light is on. Please confirm and advise.

*INSTRUCTIONS*
WARNING You must clear all codes before starting this lesson.
In this case study, we OPEN the control circuit ground to #4 fuel injector between PIN 1 of #4 injector and BOB PIN X2-49.

Engine will have a permanent misfire and fuel trims will be affected.
On the tablet open 'Wiring Diagrams with Faults' for

- Wiring Diagrams
- Breakout Box

ENGINE PERFORMAN
- CS01 - P0204 Engine runs rough
- CS03 - P0627 - P0826 Engine starts and s not restart
- CS05 Engine doesn't start
- CS07 - P171A - P171B no stop/start
- CS09 - U0164 - B3979 Air conditioning do

Case Studies - Instructor

The following case studies can be inserted and explored by you, the student. Follow the instructions indicated and perform your inspection and diagnosis accordingly.

- Engine Performance - Instructor's version
- AAT sensor lessons
- ECT sensor lessons
- MAP sensor lessons
- HO2S1 sensor lessons
- MAF sensor lessons
- APP sensor lessons

CS01 - P0204

Scenario Number: 1125
Engine running rough (1)

☐ Stop Case Study — 682

PROBLEM
Customer states engine is not running well, feels low on power and the check engine light is on. Please confirm and advise.

INSTRUCTIONS
WARNING You must clear all codes before starting this lesson.
In this case study, we OPEN the control circuit ground to #4 fuel injector between PIN 1 of #4 injector and BOB

- Wiring Diagrams
- Breakout Box

00:03:03

Case Study CS01 - P0204 A

ENGINE PERFORMANCE

- CS01 - P0204
  Engine runs rough
- CS03 - P0627 - P0629
  Engine starts and is not restart
- CS05
  Engine doesn't start doesn't start
- CS07 - P171A - P171B
  no stop/start
- CS09 - U0164 - B3979
  Air conditioning do

FIG. 20

Case Studies - Instructor

The following case studies can be inserted and explored by you, the student. Follow the instructions indicated and perform your inspection and diagnosis accordingly.

- Engine Performance - Instructor's version
- AAT sensor lessons
- ECT sensor lessons
- MAP sensor lessons
- HO2S1 sensor lessons
- MAF sensor lessons
- APP sensor lessons

MAP SENSOR LESSON

- ICS05 - P0107
  MAP sensor circuit

HO2S1 SENSOR LESSON

- ICS07 - P0137 - P017
  Engine is running r

MAF SENSOR LESSON

- ICS08 - P0101 - P110
  MAF - stuck in an i

APP SENSOR LESSON

- ICS10 - P2122
  Glitch in accelerate

---

← ICS06 - P0106

Scenario Number: 1138

MAP - stuck in an idle condition

Live scan tool data will display a pressure of 14.5 psi and the signal voltage at BOB PIN X3-40 will be near 0.6V, and will also be 0 V at the sensor PIN 4
If the fault is inserted before started, once started, the engine will lose power if you accelerate quickly.

ATTENTION This ICS lesson will not affect the internal operation of any sensor, so if you were to take measurements at the sensor you would measure a normal value and NOT the same value as on the scan tool or at the BOB.
This fault can disable the STOP/START system for various reasons, see conditions chart
DTC: P1101 Intake Air Flow Performance TYPE B

- Wiring Diagrams
- Breakout Box

STUDENT TRAINING SYSTEM FOR A VEHICLE SYSTEM

BACKGROUND

Technical schools have provided teachers to instruct students on diagnosing problems with vehicle systems. A problem that has occurred in recent years is that the number of experienced teachers for vehicle systems has decreased. As a result, many technical schools may not have a sufficient number of experienced teachers to instruct students on how to diagnose operational problems in vehicle systems.

Accordingly, the inventors herein have recognized a need for a student training system that has case studies that teachers and students can utilize to automatically set up operational problems in a vehicle system which allows students to diagnose the operational problems. The student training system not only instructs the students, but also allows relatively inexperienced teachers to enhance their knowledge and instructional capabilities regarding diagnosing vehicle systems.

SUMMARY

A student training system for a vehicle system in accordance with an exemplary embodiment is provided. The student training system includes a primary computer having a display device and an input device. The student training system further includes an intermediate microprocessor operably communicating with the primary computer utilizing a communication bus. The intermediate microprocessor is operably coupled to a controllable switch. The controllable switch has first and second terminals. The first terminal is electrically coupled to a controller in the vehicle system. The second terminal is electrically coupled to a first device in the vehicle system. The controllable switch has a first operational state wherein the first device is electrically coupled to the controller, and a second operational state wherein the first device is electrically de-coupled from the controller. The primary computer displays a first graphical user interface (GUI) on the display device. The first GUI has at least a first case study command button associated with a first case study. The first case study is a training assignment associated with a first operational problem in the vehicle system. The primary computer displays a second GUI on the display device when the first case study command button is selected utilizing the input device. The second GUI has text that describes the first operational problem in the vehicle system. The second GUI has a start case study command button for initiating the first operational problem in the vehicle system. The primary computer sends a first case study start command code to the intermediate microprocessor via the communication bus when the start case study command button is selected. The intermediate microprocessor generates a first control signal in response to the first case study start command code to induce the controllable switch to transition to the second operational state wherein the first device is electrically de-coupled from the controller to induce the vehicle system to have the first operational problem.

A student training system for a vehicle system in accordance with another exemplary embodiment is provided. The student training system includes a primary computer having a display device and an input device. The student training system further includes an intermediate microprocessor operably communicating with the primary computer utilizing a communication bus. The intermediate microprocessor is operably coupled to a controllable single pole double throw switch. The controllable single pole double throw switch has first, second, and third terminals. The first terminal is electrically coupled to a controller in the vehicle system. The second terminal is electrically coupled to a first device in the vehicle system. The third terminal is electrically coupled to a signal generator. The controllable single pole double throw switch has a first operational state wherein the first electrical terminal is electrically coupled to the second terminal. The controllable single pole double throw switch has a second operational state wherein the first electrical terminal is electrically coupled to the third terminal. The primary computer displays a first GUI on the display device. The first GUI has at least a first case study command button associated with a first case study. The first case study is a training assignment associated with a first operational problem in the vehicle system. The primary computer displays a second GUI on the display device when the first case study command button is selected utilizing the input device. The second GUI has text that describes the first operational problem in the vehicle system. The second GUI has a start case study command button for initiating the first operational problem in the vehicle system. The primary computer sends a first case study start command code to the intermediate microprocessor via the communication bus when the start case study command button is selected. The intermediate microprocessor generates a first control signal in response to the first case study start command code. The first control signal induces the controllable single pole double throw switch to transition to the second operational state such that a fault simulation signal from the signal generator is received by the controller to induce the vehicle system to have the first operational problem.

A student training system for a vehicle system in accordance with another exemplary embodiment is provided. The student training system includes a primary computer having a display device and an input device. The student training system includes an intermediate microprocessor operably communicating with the primary computer utilizing a communication bus. The intermediate microprocessor is operably coupled to a controllable switch. The controllable switch has first and second terminals. The first terminal is electrically coupled to a controller in the vehicle system. The second terminal is electrically coupled to a first device in the vehicle system. The controllable switch has a first operational state wherein the first device is electrically coupled to the controller, and a second operational state wherein the first device is electrically de-coupled from the controller. The primary computer displays a first GUI on the display device. The first GUI has at least a first input box for receiving a scenario number. A first scenario number is associated with a first case study. The first case study is a training assignment associated with a first operational problem in the vehicle system. The primary computer sends a first case study start command code to the intermediate microprocessor via the communication bus when the first scenario number is input in the first input box. The intermediate microprocessor generates a first control signal in response to the first case study start command code to induce the controllable switch to transition to the second operational state wherein the first device is electrically de-coupled from the controller to induce the vehicle system to have the first operational problem.

BRIEF DESCRIPTION OF THE DRAWINGS

FIG. 7 is a schematic of a safety warnings GUI utilized in the student training system of FIG. 1;

FIG. 11 is another schematic of the case study GUI of FIG. 10;

FIG. 19 is another schematic of the case study GUI of FIG. 18;

FIG. 20 is another schematic of the case study GUI of FIG. 18;

FIG. 25 is another schematic of the case study GUI of FIG. 24;

FIG. 26 is another schematic of the case study GUI of FIG. 24;

DETAILED DESCRIPTION

Figure 1:
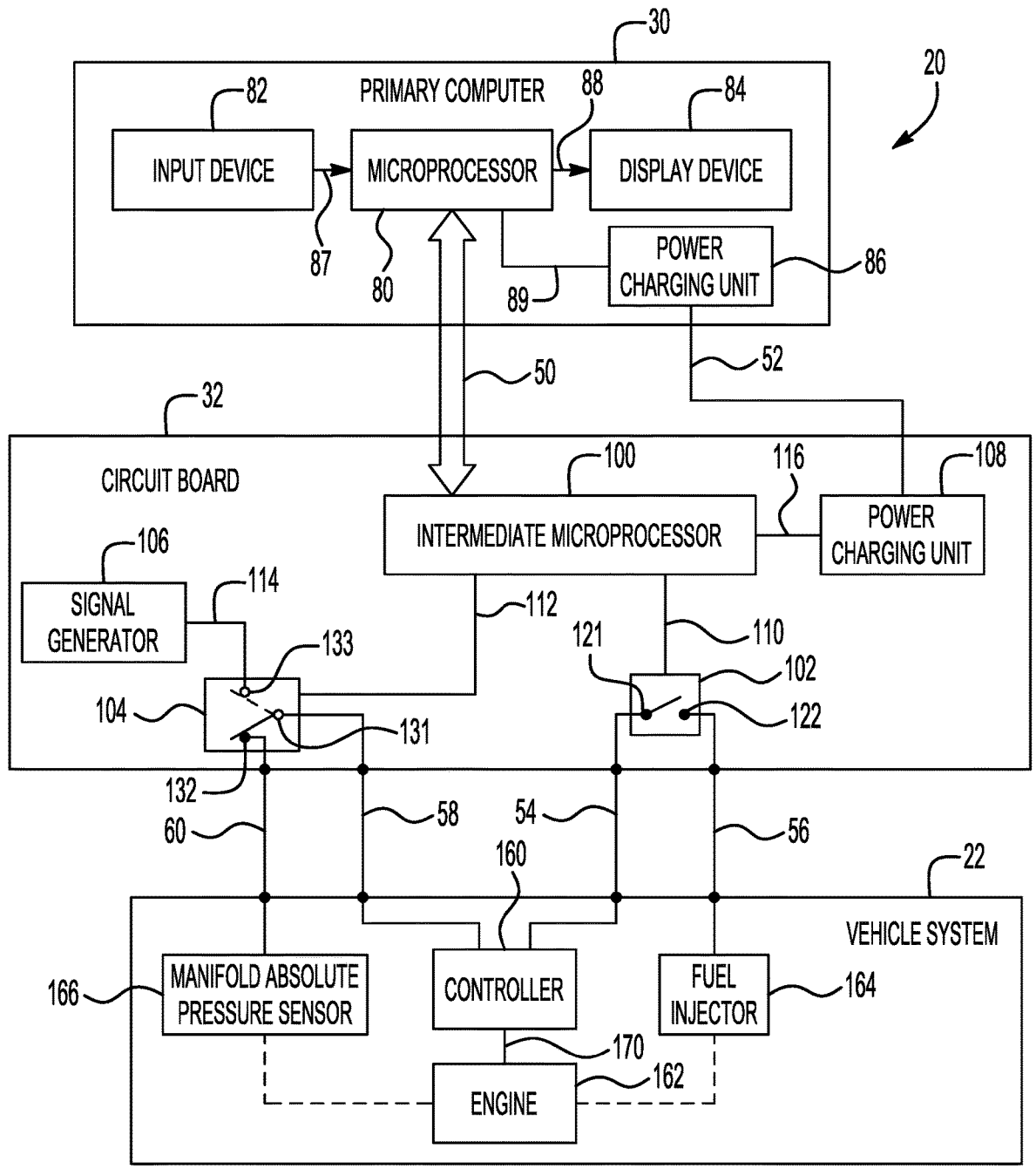
FIG. 1 is a schematic of a student training system for a vehicle system in accordance with an exemplary embodiment.

Referring to FIG. 1, a student training system 20 for a vehicle system 22 in accordance with an exemplary embodiment is provided. The student training system 20 includes a primary computer 30, a circuit board 32, a communication bus 50, and electrical lines 52, 54, 56, 58, 60.

For purposes of understanding, a few terms will be defined herein.

A "case study" is a training assignment associated with an operational problem in a vehicle system that allow a student to diagnose the operational problem.

A "device" is a sensor or a controllable component of a vehicle system.

A "controllable switch" is a switch whose operational state (e.g., closed operational state or open operational state) is controlled by a control signal received by the switch. For example, a controllable switch can be an electrical switch, a transistor, a contactor, or an electrical relay.

A "controllable single pole double throw switch" is a single pole double throw switch whose operational state is controlled by a control signal received by the switch.

A "text that describes an operational problem in the vehicle system" is text that explains undesired operation of the vehicle system but does not include any information on a specific cause (e.g., open circuit condition or faulty signal or malfunctioning component of the vehicle system or simulated malfunctioning component of the vehicle system) of the operational problem in the vehicle system.

A "command button" is a clickable image object that appears on a graphical user interface that allows a user to trigger an event or an action.

The primary computer 30 is provided to allow a student and a teacher to control operation of the student training system 20. The primary computer 30 includes a microprocessor 80, an input device 82, a display device 84, a power charging unit 86, and electrical lines 86, 87, 88, 89.

The microprocessor 80 is operably coupled to the input device 82 utilizing the electrical line 87. The microprocessor 80 receives inputted data and commands utilizing the input device 82 and performs the methods of the primary computer 30 utilizing the inputted data and commands.

The microprocessor 80 is operably coupled to the display device 84 utilizing the electrical line 88 and displays the GUIs described herein on the display device 84. The microprocessor 80 operably communicates with the intermediate microprocessor 100 on the circuit board 32 via the communication bus 50.

The power charging unit 86 provides electrical power to the microprocessor 80 utilizing the electrical line 89. The power charging unit 86 is electrically coupled to the power charging unit 108 on the circuit board 32.

The circuit board 32 is provided to hold an intermediate microprocessor 100, a controllable switch 102, a controllable single pole double throw switch 104, a signal generator 106, a power charging unit 108, and electrical lines 110, 112, 114, 116 thereon.

The intermediate microprocessor 100 operably communicates with the primary computer 30 utilizing the communication bus 50. The intermediate microprocessor 100 is operably coupled to the controllable switch 102 utilizing the electrical line 110. The intermediate microprocessor is operably coupled to the controllable single pole double throw switch 104 utilizing the electrical line 112.

The controllable switch 102 has first and second terminals 121, 122. The first terminal 121 is electrically coupled to a controller 160 in the vehicle system 22. The second terminal 122 is electrically coupled to a fuel injector 164 in the vehicle system 22. The controllable switch 102 has a first operational state in response to a first control signal from the intermediate processor 100 wherein the first terminal 121 is electrically coupled to the second terminal 122 such that the fuel injector 164 is electrically coupled to the controller 160. Further, the controllable switch 102 has a second operational state in response to a second control signal from the intermediate microprocessor 100 wherein the first terminal 121 is electrically de-coupled from the second terminal 122 such that the fuel injector 164 is electrically de-coupled from the controller 160.

The controllable single pole double throw switch 104 has first, second, and third terminals 131, 132, 133. The first terminal 131 is electrically coupled to the controller 160 in the vehicle system 22 utilizing the electrical line 58. The second terminal 132 is electrically coupled to a manifold absolute pressure sensor 166 in the vehicle system 22 utilizing the electrical line 60. The third terminal 133 is electrically coupled to a signal generator 106 utilizing the electrical line 114. The controllable single pole double throw switch 104 has a first operational state in response to a first control signal from the intermediate microprocessor 100 wherein the first electrical terminal 131 is electrically coupled to the second terminal 132 to electrically couple the manifold absolute pressure sensor 166 to the controller 160. The controllable single pole double throw switch 104 has a second operational state in response to a second control signal from the intermediate microprocessor 100 wherein the first electrical terminal 131 is electrically coupled to the third terminal 133 to electrically couple the signal generator 106 to the controller 160.

The signal generator 106 is electrically coupled to the third terminal 133 of the controllable single pole double throw switch 104 utilizing the electrical line 114. The signal generator 106 generates a simulation signal that corresponds to a signal output by the manifold absolute pressure sensor 166 when the sensor 166 is malfunctioning.

The power charging unit 108 is the main power source for the student training system 20 and is electrically coupled to a 120 VAC power source (not shown). In particular, the power charging unit 108 provides electrical power to the intermediate microprocessor 100 utilizing the electrical line 116. Further, the power charging unit 108 is electrically coupled to the power charging unit 86 of the primary computer 30 utilizing the electrical line 52.

The vehicle system 22 includes a controller 160, an engine 162, a fuel injector 164, and a manifold absolute pressure sensor 166. The controller 160 is provided to control operation of the engine 162 and the fuel injector 164. Further, the controller 160 is provided to receive a signal from the manifold absolute pressure sensor 166.

The controller 160 is electrically coupled to the engine 162 via the electrical line 170. Further, the controller 160 is electrically coupled to the first terminal 121 of the controllable switch 102 utilizing the electrical line 54. Also, the controller 160 is electrically coupled to the first terminal 131 of the controllable single pole double throw switch 104 utilizing the electrical line 58.

The manifold absolute pressure sensor 166 is electrically coupled to the second terminal 132 of the controllable single pole double throw switch 104 utilizing the electrical line 60. Further, the fuel injector 164 is electrically coupled to the second terminal 122 of the controllable switch 102 utilizing the electrical line 56.

Before providing a detailed explanation of the operation of the student training system 20, an explanation of the GUIs utilized by the system 20 will be provided.

Figure 2:
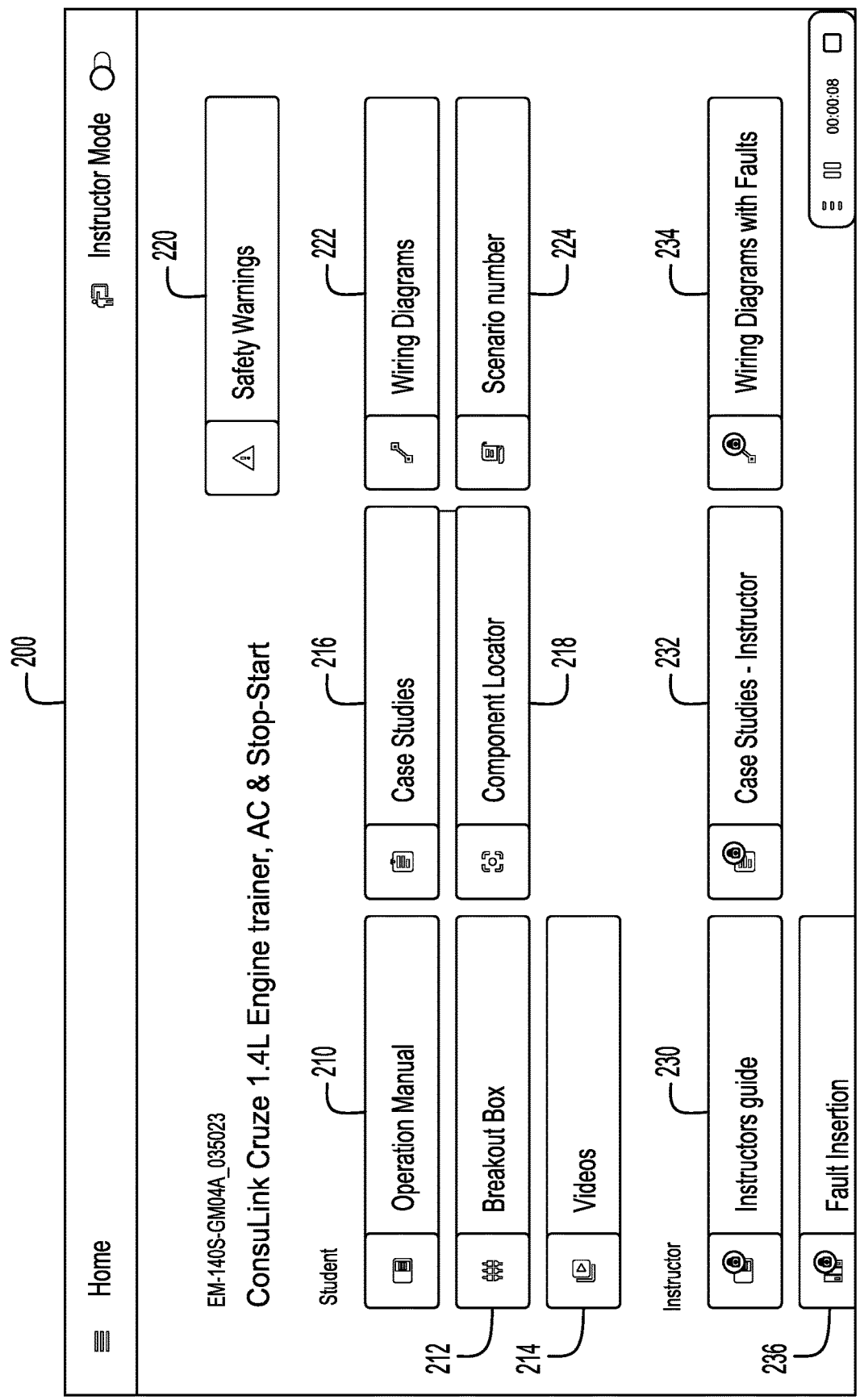
FIG. 2 is a schematic of a main GUI utilized in the student training system of FIG. 1 when the student training system is in a student operational mode.

Referring to FIGS. 1 and 2, the main GUI 200 that is displayed on the display device 84 is illustrated. The main GUI 200 includes an operation manual command button 210, a breakout box command button 212, a videos command button 214, a case studies command button 216, a component locator command button 218, a safety warnings command button 220, a wiring diagrams command button 222, a scenario number command button 224, an instructors guide command button 230, a case studies instructor command button 232, a wiring diagrams with faults command button 234, and a fault insertion command button 236.

When the student training system 20 is in a student operational mode, the operation manual command button 210, the breakout box command button 212, the videos command button 214, the case studies command button 216, the component locator command button 218, the safety warnings command button 220, the wiring diagrams command button 222, and the scenario number command button 224 are accessible by a student.

Figure 3:
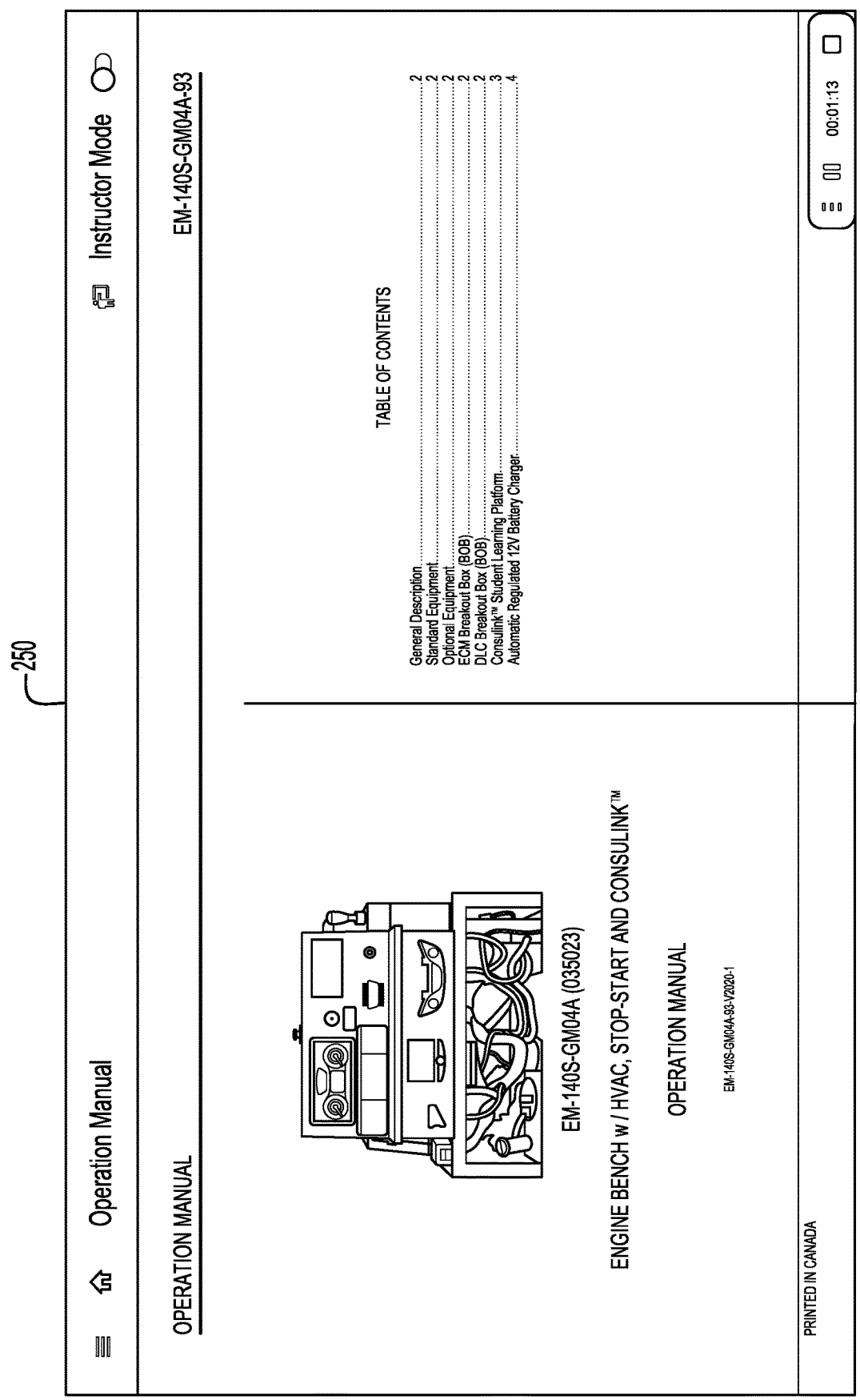
FIG. 3 is a schematic of an operation manual GUI utilized in the student training system of FIG. 1.

Referring to FIGS. 1-3, when a user selects the operation manual command button 210 utilizing the input device 82, the operation manual GUI 250 is displayed on the display device 84. The operation manual GUI 250 provides detailed information for operating the student training system 20.

Figure 4:
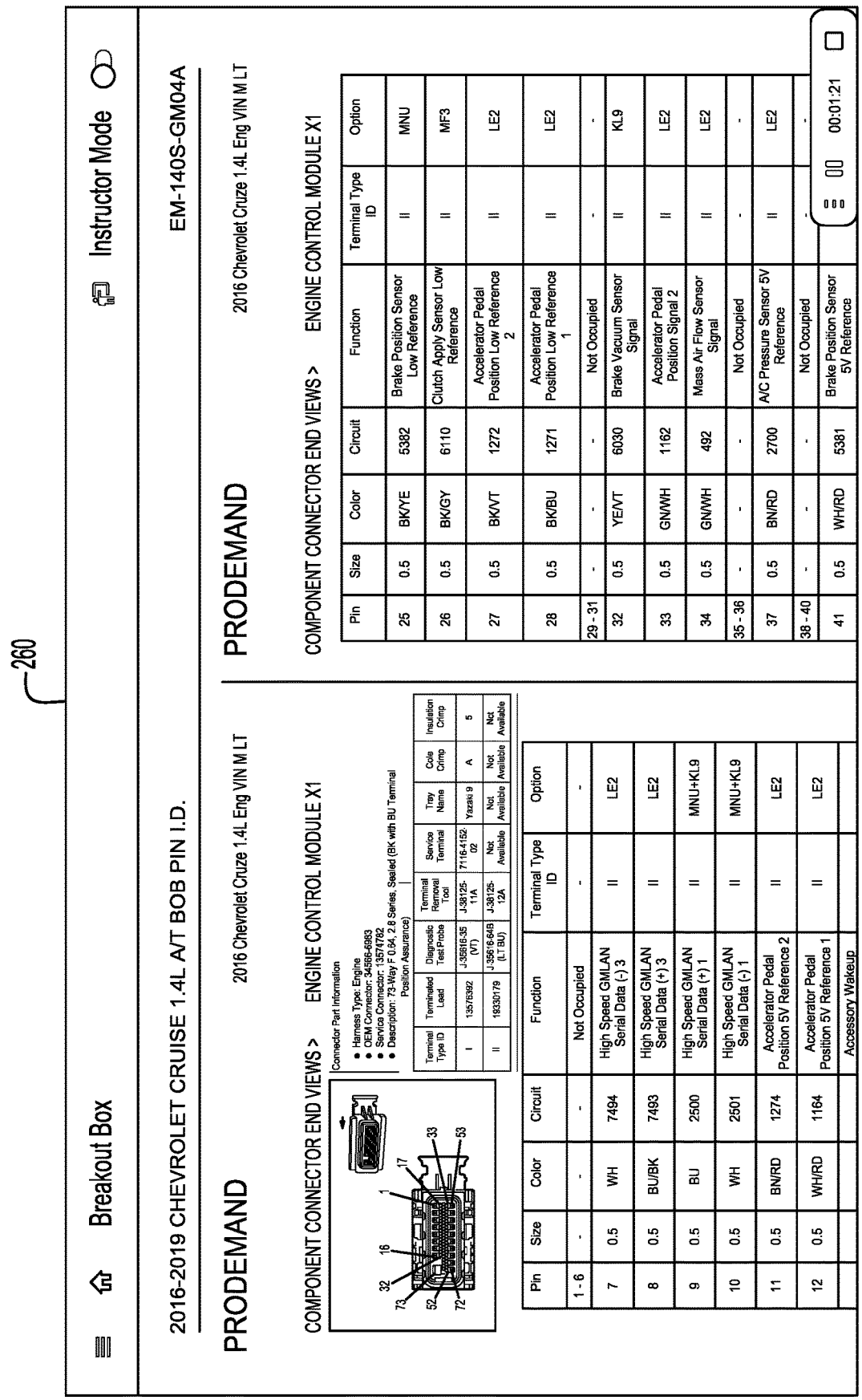
FIG. 4 is a schematic of a breakout box GUI utilized in the student training system of FIG. 1.

Referring to FIGS. 1, 2 and 4, when a user selects the breakout box command button 212 utilizing the input device 82, the breakout box GUI 260 is displayed on the display device 84. The breakout box GUI 260 provides a detailed description of the electrical connectors utilized in the circuit board 32 for electrically coupling the circuit board 32 to the vehicle system 22.

Referring to FIGS. 1 and 2, when the user selects the videos command button 214 utilizing the input device 82, videos associated with the operation of the student training system 20 can be selected utilizing the input device 82.

Figure 5:
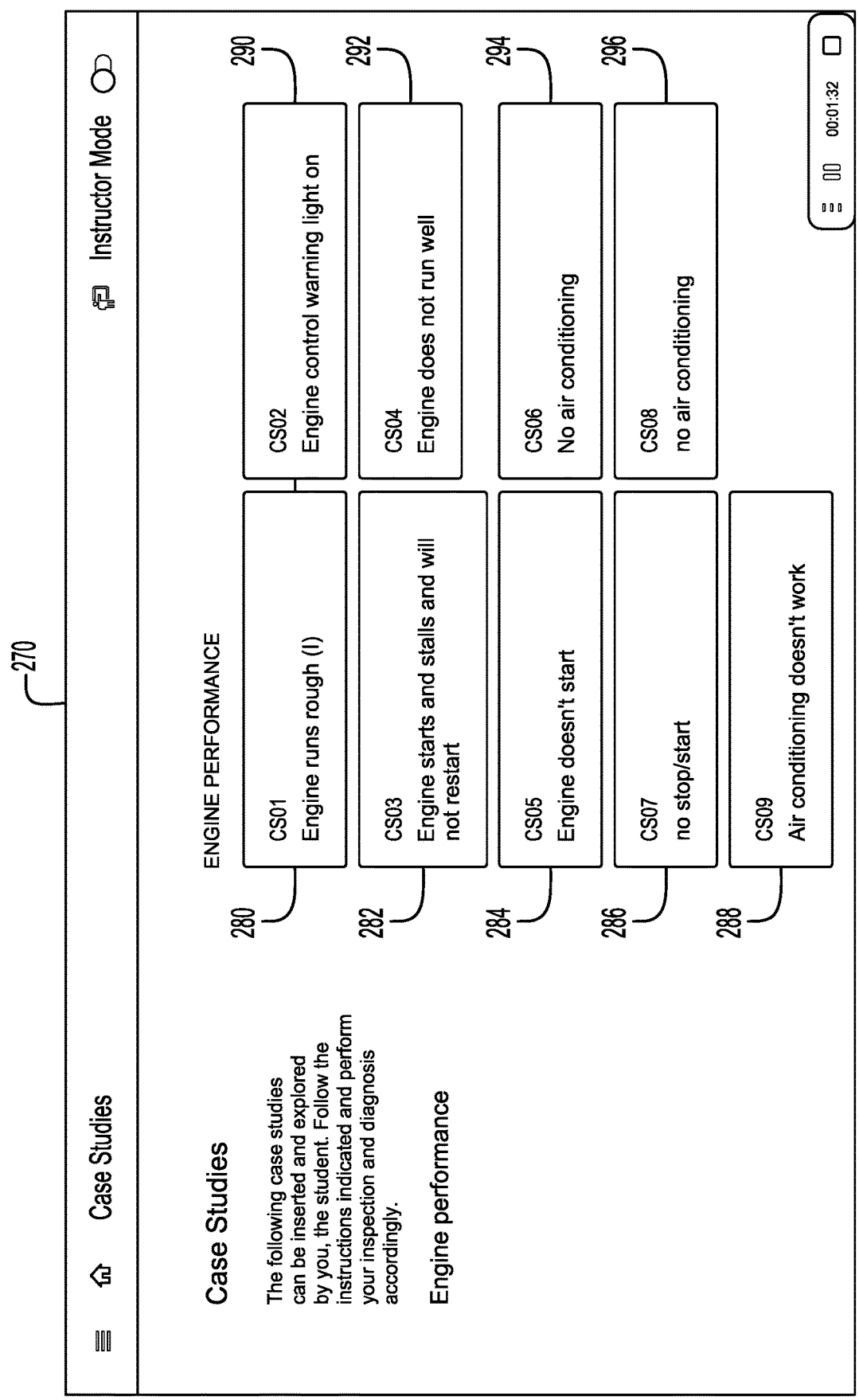
FIG. 5 is a schematic of a case studies GUI utilized in the student training system of FIG. 1 when the student training system is in a student operational mode.

Referring to FIGS. 1, 2 and 5, when a user selects the case studies command button 216 utilizing the input device 82, the case studies GUI 270 is displayed on the display device 84. The case studies GUI 270 allows a student to select one of a plurality of case study command buttons utilizing the input device 82 wherein each command button is associated with a specific case study. In particular, the case studies GUI 270 includes case study command buttons 280, 282, 284, 286, 288, 290, 292, 294, 296 that are each associated with a specific case study. For example, the case study command button 280 is associated with a case study entitled "CS01 engine runs rough (1)."

Figure 6:
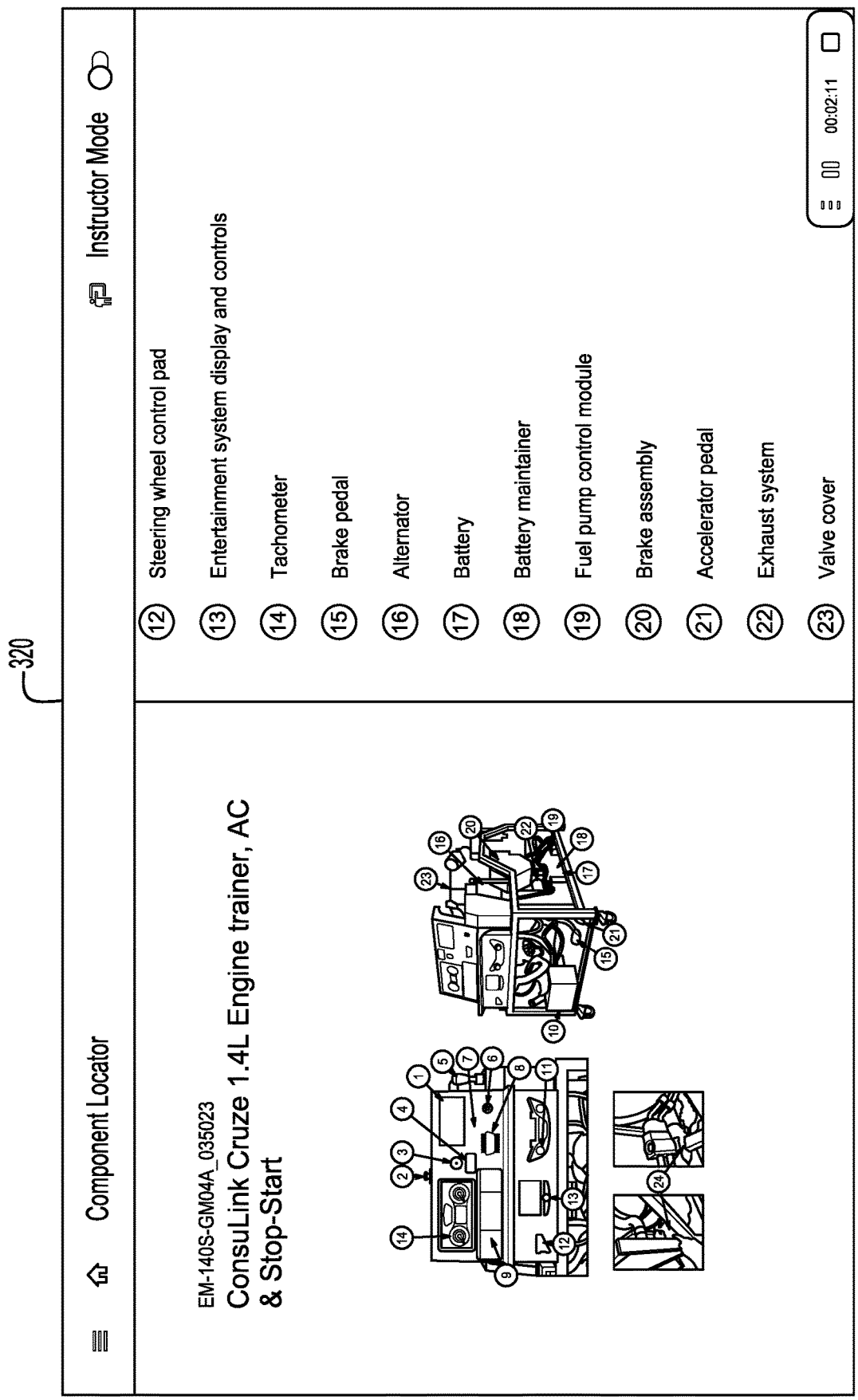
FIG. 6 is a schematic of a component locator GUI utilized in the student training system of FIG. 1.

Referring to FIGS. 1, 2 and 6, when a user selects the component locator command button 218 utilizing the input device 82, the component locator GUI 320 is displayed on the display device 84. The component locator GUI 320 provides a schematic of the student training system 20 and the vehicle system 22 and identifies the components of the student training system 20 and the vehicle system 22.

Referring to FIGS. 1, 2 and 7, when a user selects the safety warnings command button 220 utilizing the input device 82, the safety warnings GUI 322 is displayed on the display device 84. The safety warnings GUI 322 provides a description of the safety warnings associated with the student training system 20 and the vehicle system 22.

Figure 8:
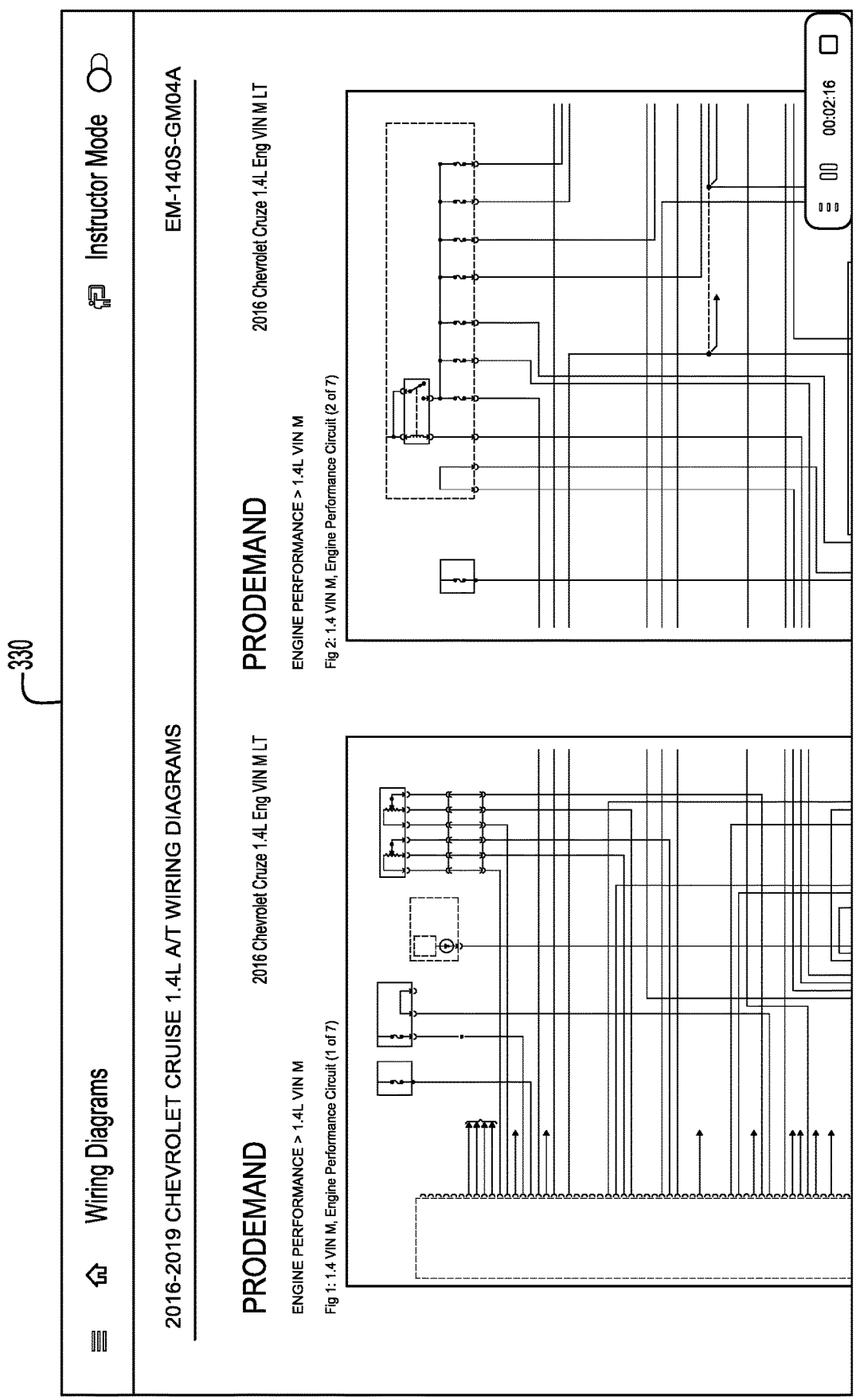
FIG. 8 is a schematic of a wiring diagrams GUI utilized in the student training system of FIG. 1.

Referring to FIGS. 1, 2 and 8, when a user selects the wiring diagrams command button 222 utilizing the input device 82, the wiring diagrams GUI 330 is displayed on the display device 84. The wiring diagrams GUI 330 provides detailed electrical schematics of the circuit board 32 and the vehicle system 22.

Figure 9:
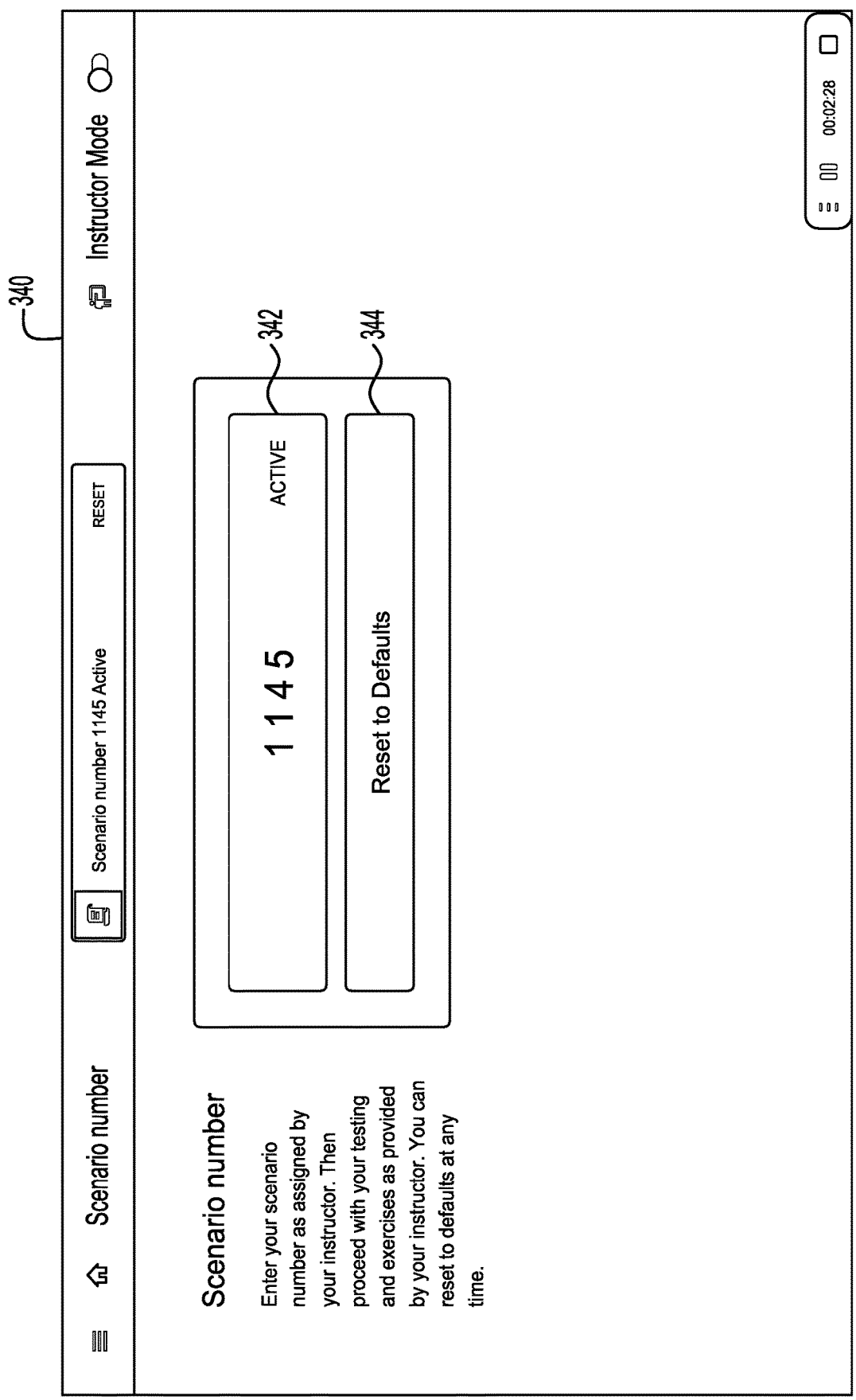
FIG. 9 is a schematic of a scenario number GUI utilized in the student training system of FIG. 1.
Figure 10:
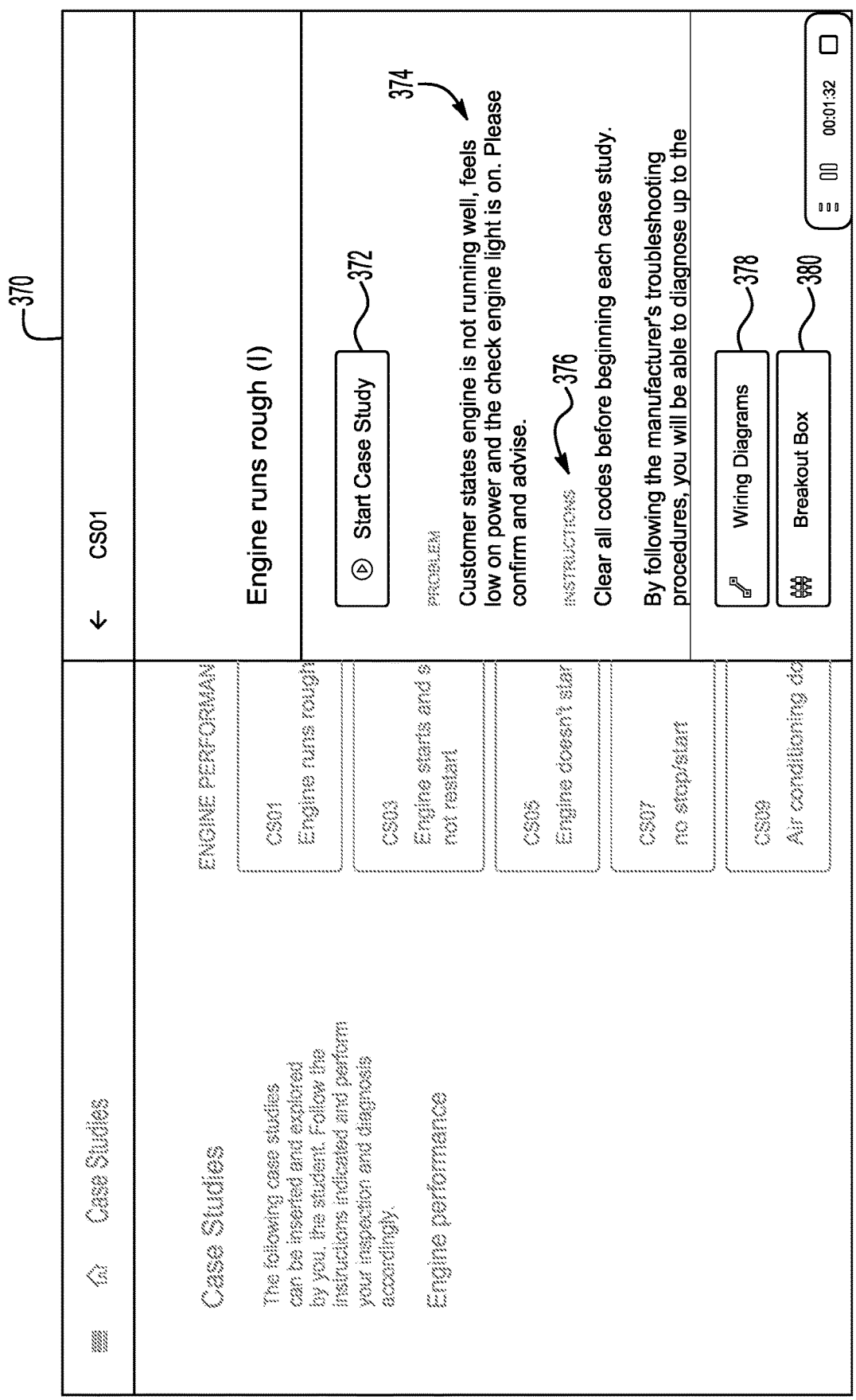
FIG. 10 is a schematic of a case study GUI accessed utilizing the case studies GUI of FIG. 5 when the student training system is in a student operational mode.
Figure 12:
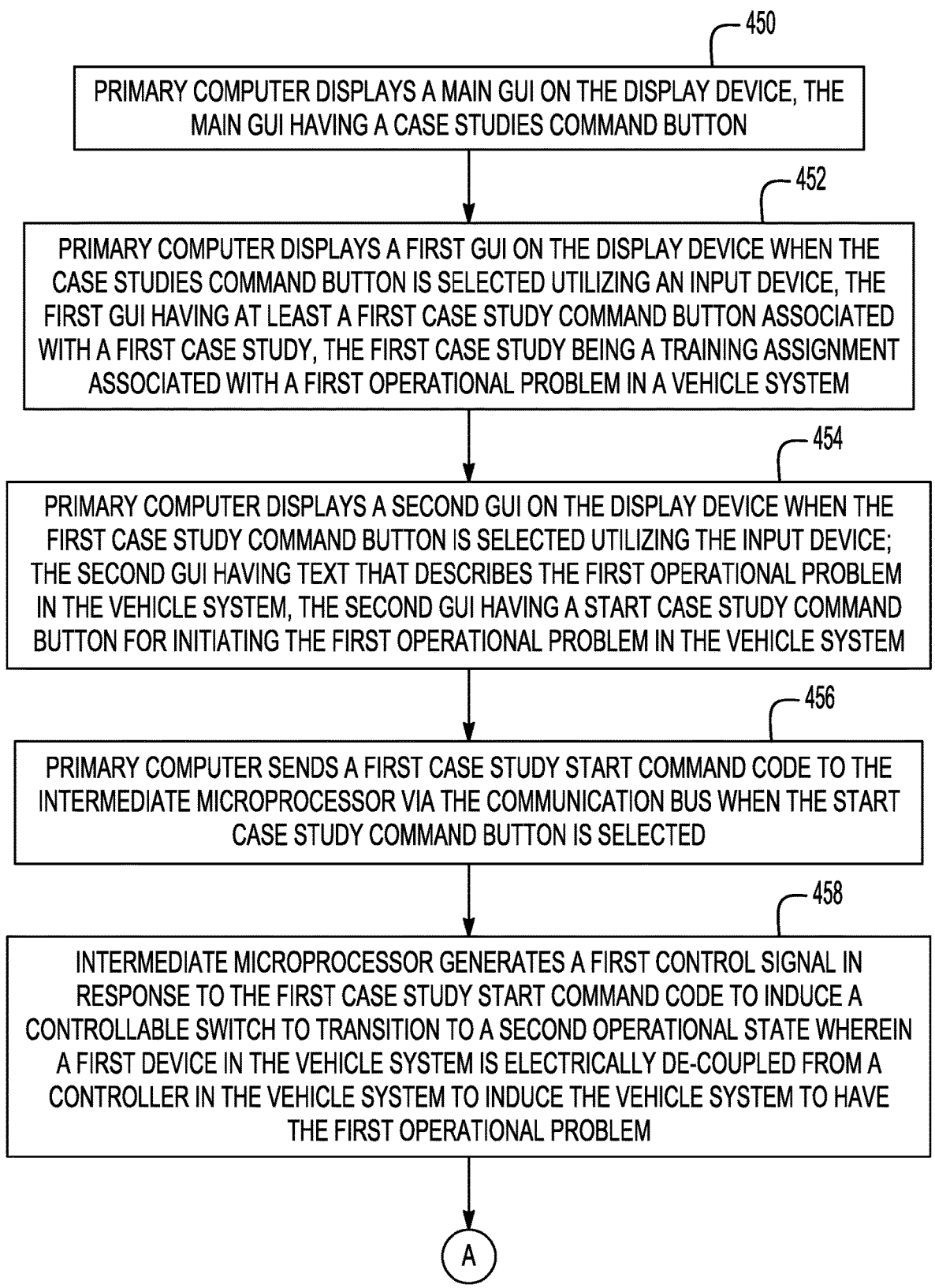
FIGS. 12-13 are flowcharts of a method for utilizing the student training system and the case study GUI of FIGS. 10 and 11 when the student training system is in a student operational mode.
Figure 13:
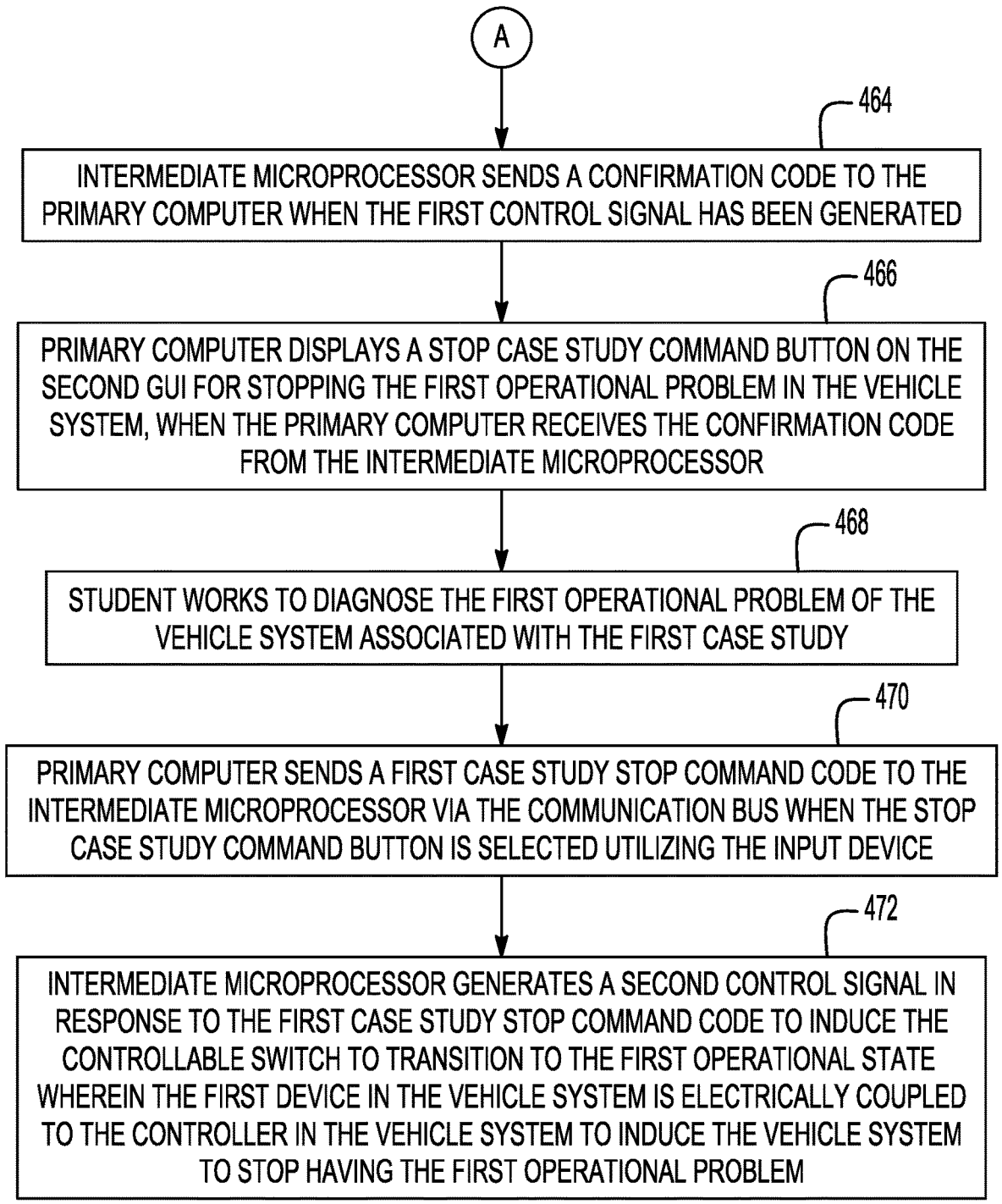

Referring to FIGS. 1 and 9, when the user selects the scenario number command button 224 utilizing the input device 82, the scenario number GUI 340 is displayed on the display device 84 (shown in FIG. 1). The scenario number GUI 340 includes an input box 342 and a reset to defaults command button 344. When the user inputs a scenario number (which corresponds to a case study that is not known by the user) in the input box 342, utilizing the input device 82, the student training system 20 initiates a case study associated with the scenario number which causes a specific operational problem in the vehicle system 22. When the user selects the reset to defaults command button 344 utilizing the input device 82, the student training system 20 exits the case study associated with the scenario number and returns the vehicle system 22 to normal operation.

Referring to FIG. 2, when the student training system 20 is in a teacher operational mode, the instructors guide command button 230, the case studies instructor command button 232, the wiring diagrams with faults command button 234, and the fault insertion command button 236 are only accessible by a teacher and will be explained in greater detail below. It is noted that the command buttons 230, 232, 234, 236 are never accessible by a student.

First Case Study

Referring to FIGS. 1, 5, 10, and 11, the GUIs and the operational steps associated with a first case study when the student training system is in a student operational mode will now be explained.

In particular, when a student selects the command button 280 entitled "CS01 engine runs rough (1)" on the case studies GUI 270, the GUI 370 associated with the case study entitled "CS01 engine runs rough (1)" is displayed on the display device 84.

Figure 11:
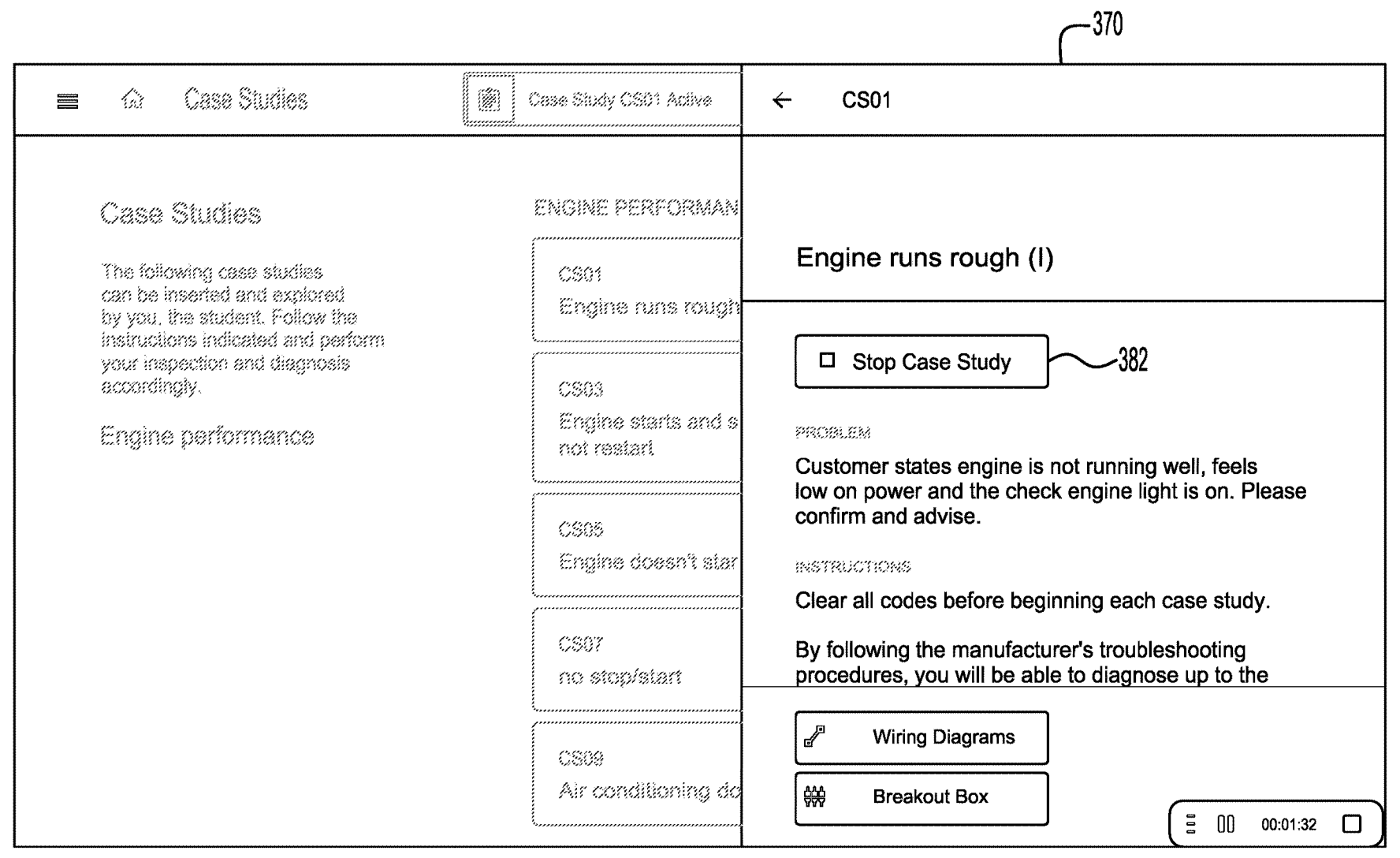

The case study GUI 370 includes a start case study command button 372, a first text region 374, a second text region 376, wiring diagrams command button 378, a breakout box command button 380, and a stop case study command button 382 (shown in FIG. 11).

When a student selects the start case study command button 372 utilizing the input device 82, the student training system 20 performs steps to induce the vehicle system 22 to have a predetermined operational problem associated with the case study.

The first text region 374 describes the operational problem associated with the vehicle system 22 and a high level but does not disclose the root cause of the operational problem. The student is required to determine the root cause of the operational problem.

The second text region 376 provides some high-level instructions for the student to follow in order to diagnose the root cause of the operational problem in the vehicle system 22.

When the student selects the wiring diagrams command button 378 utilizing the input device 82, the wiring diagrams GUI 330 (shown in FIG. 8) is displayed on the display device 84. The student may utilize the wiring schematics displayed on the wiring diagrams GUI 330 in order to diagnose the root cause of the operational problem in the vehicle system 22.

When the student selects the breakout box command button 380 utilizing the input device 82, the breakout box GUI 260 (shown in FIG. 4) is displayed on the display device 84. The student may utilize the information in the breakout box GUI 260 in order to diagnose the root cause of the operational problem in the vehicle system 22.

After a student has diagnosed the root cause of the operational problem in the vehicle system 22, the student selects the stop case study command button 382 (shown in FIG. 11) utilizing the input device 82, and in response the student training system 20 performs steps to induce the system 22 to not have the predetermined operational problem associated with the case study. In other words, the student training system 20 stops the operational problem in the vehicle system 22.

Referring to FIGS. 1, 5, 10, 11-13, a flowchart of a method for performing the first case study (e.g., case study entitled "CS01 engine runs rough (1)" associated with the command button 280 shown in FIG. 2) when the student training system is in the student operational mode will be explained.

At step 450, the primary computer 30 displays a main GUI 200 on the display device 84. The main GUI 200 has a case studies command button 216. After step 450, the method advances to step 452.

At step 452, the primary computer 30 displays a first GUI (e.g., case studies GUI 270 shown in FIG. 5) on the display device 84 when the case studies command button 216 is selected utilizing an input device 82. The first GUI (e.g., case study GUI 270) has at least a first case study command button 280 associated with a first case study. The first case study is a training assignment associated with a first operational problem in a vehicle system 22. After step 452, the method advances to step 454.

At step 454, the primary computer 30 displays a second GUI (e.g., case study GUI 370 shown in FIG. 10) on the display device 84 when the first case study command button 280 is selected utilizing the input device 82. The second GUI (e.g., case study GUI 370) has text that describes the first operational problem in the vehicle system 22. The second GUI (e.g., case study GUI 370) has a start case study command button 372 for initiating the first operational problem in the vehicle system 22. After step 454, the method advances to step 456.

At step 456, the primary computer 30 sends a first case study start command code to the intermediate microprocessor 100 via the communication bus 50 when the start case study command button 372 is selected. After step 456, the method advances to step 458.

At step 458, the intermediate microprocessor 100 generates a first control signal in response to the first case study start command code to induce a controllable switch 102 to transition to a second operational state wherein a first device (e.g., fuel injector 164) in the vehicle system 22 is electrically de-coupled from a controller 160 in the vehicle system 22 to induce the vehicle system 22 to have the first operational problem. After step 458, the method advances to step 464.

At step 464, the intermediate microprocessor 100 sends a confirmation code to the primary computer 30 when the first control signal has been generated. After step 464, the method advances to step 466.

At step 466, the primary computer 30 displays a stop case study command button 382 (shown in FIG. 11) on the second GUI (e.g., case study GUI 370) for stopping the first operational problem in the vehicle system 22, when the primary computer 30 receives the confirmation code from the intermediate microprocessor 100. After step 466, the method advances to step 468.

At step 468, the student works to diagnose the first operational problem of the vehicle system 22 associated with the first case study. After step 468, the method advances to step 470.

At step 470, the primary computer 30 sends a first case study stop command code to the intermediate microprocessor 100 via the communication bus 50 when the stop case study command button 382 is selected utilizing the input device 82. After step 470, the method advances to step 472.

At step 472, the intermediate microprocessor 100 generates a second control signal in response to the first case study stop command code to induce the controllable switch 102 to transition to the first operational state wherein the first device (e.g., fuel injector 164) in the vehicle system 22 is electrically coupled to the controller 160 in the vehicle system 22 to induce the vehicle system 22 to stop having the first operational problem.

Second Case Study

Referring to FIGS. 1 and 14-20, the GUIs and the operational steps associated with a second case study when the student training system is in a teacher operational mode will now be explained.

Figure 14:
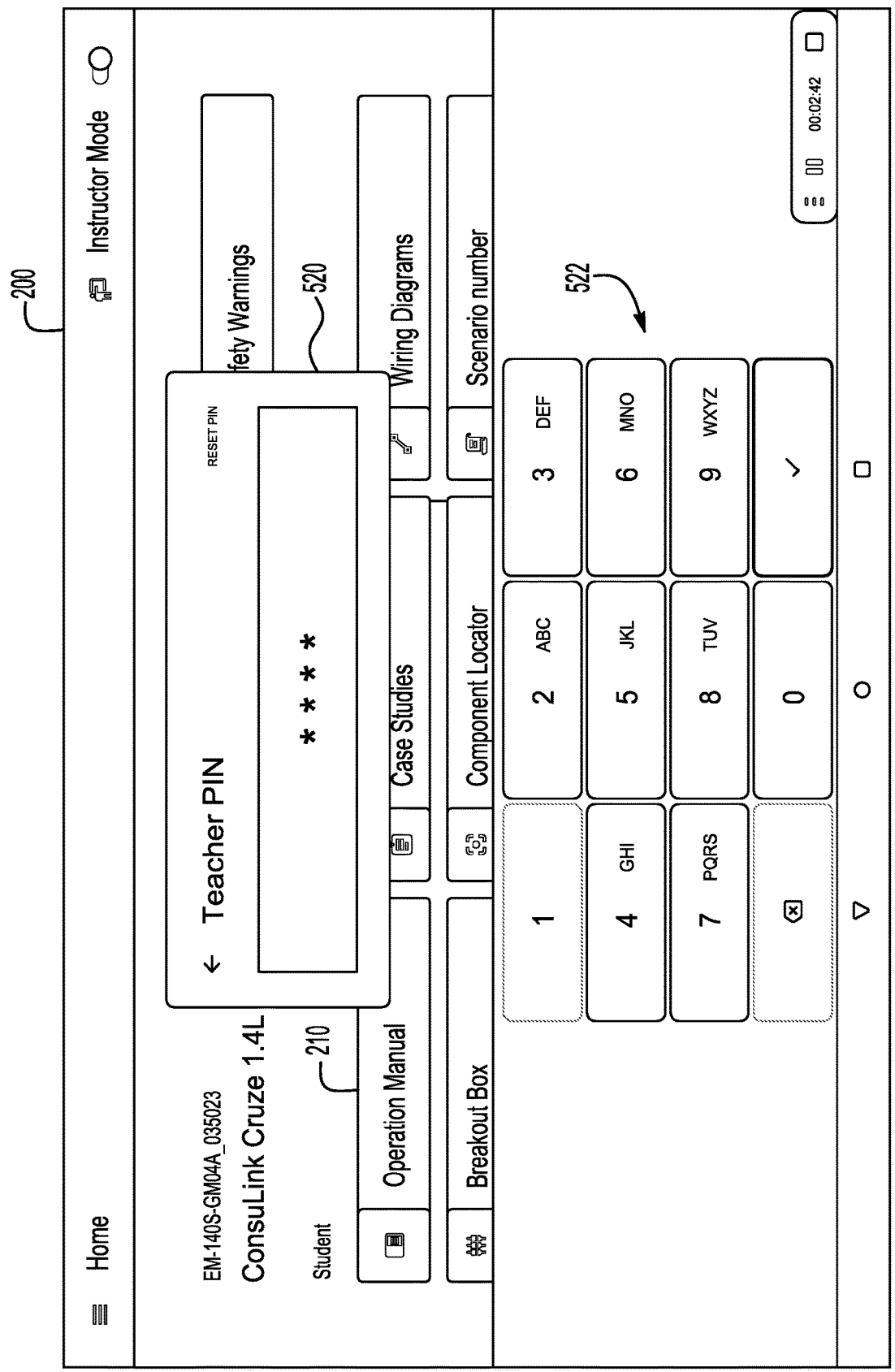
FIG. 14 is another schematic of the main GUI of FIG. 2 having a teacher pin input box.
Figure 15:
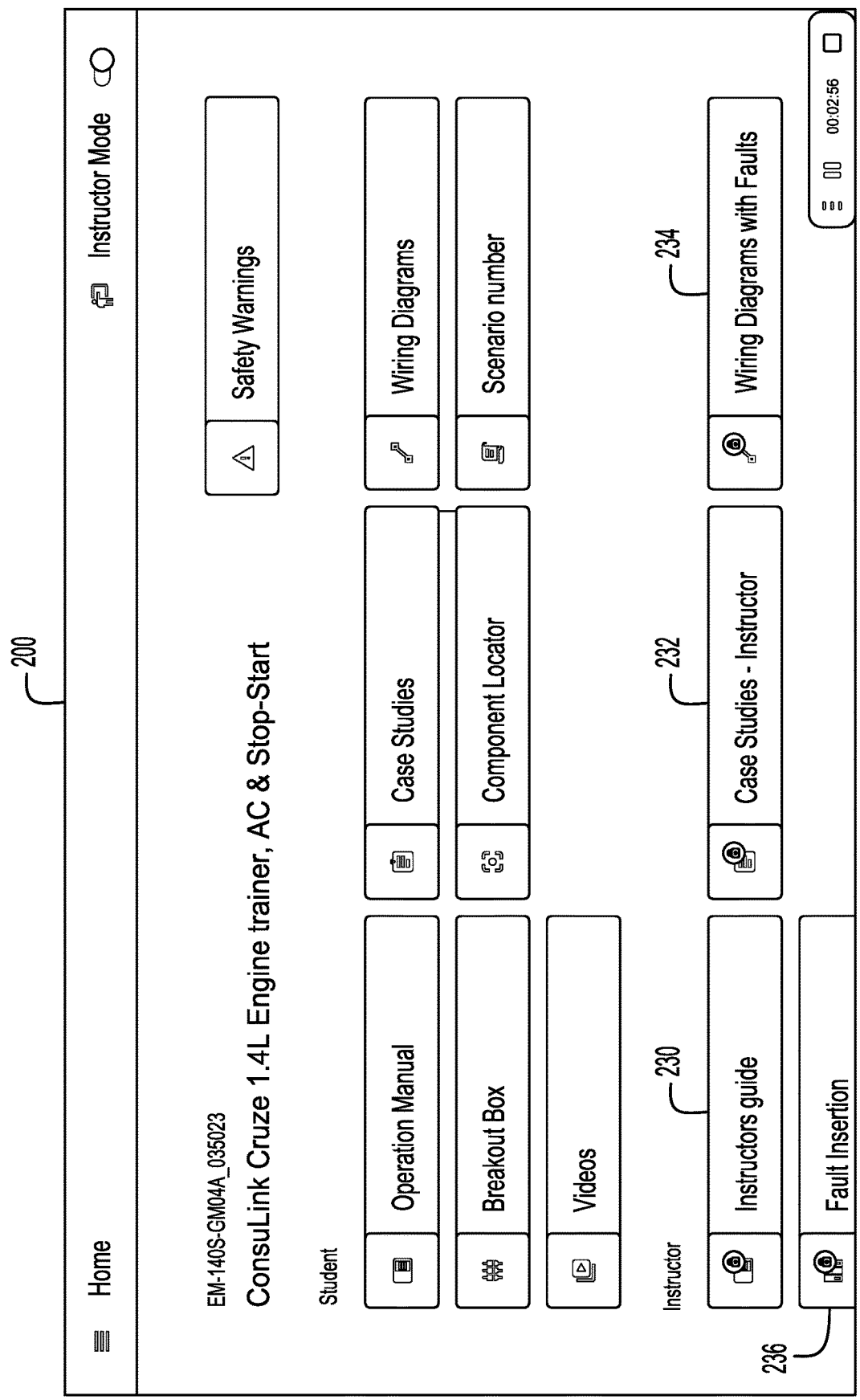
FIG. 15 is a schematic of the main GUI of FIG. 14 utilized in the student training system of FIG. 1 when the student training system is in a teacher operational mode.

Referring to FIGS. 1, 14 and 15, initially a teacher accesses the main GUI 200 which has a teacher pin input box 520 and a key pad menu 522. When the teacher inputs a valid teacher pin code in the teacher pin input box 520 utilizing the input device 82, the main menu 200 is displayed on the display device 84 with additional command buttons being accessible and the student training system 20 enters a teacher operational mode. In particular, the teacher can access the instructors guide command button 230, the case studies instructor command button 232, the wiring diagrams with faults command button 234, and the fault insertion command button 236.

Figure 16:
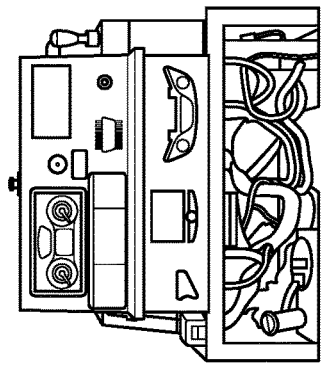
FIG. 16 is a schematic of an instructors manual GUI utilized in the student training system of FIG. 1 when the student training system is in a teacher operational mode.

Referring to FIGS. 1, 15 and 16, when the teacher selects the instructors guide command button 230 utilizing the input device 82, the instructors guide GUI 550 (shown in FIG. 16) is displayed on the display device 84. The instructors guide GUI 550 displays an instructors guide that provides detailed information for operating the student training system 20.

Referring to FIGS. 1 and 15, when the teacher selects the wiring diagrams with faults command button 230 utilizing the input device 82, a GUI (not shown) displays wiring diagrams with faults that allows the teacher to better understand the fault conditions in the vehicle system 22.

When the teacher selects the fault insertion command button 236 utilizing the input device 82, a GUI (not shown) allows the teacher to initiate a selected operational problem in the vehicle system 22.

Figure 17:
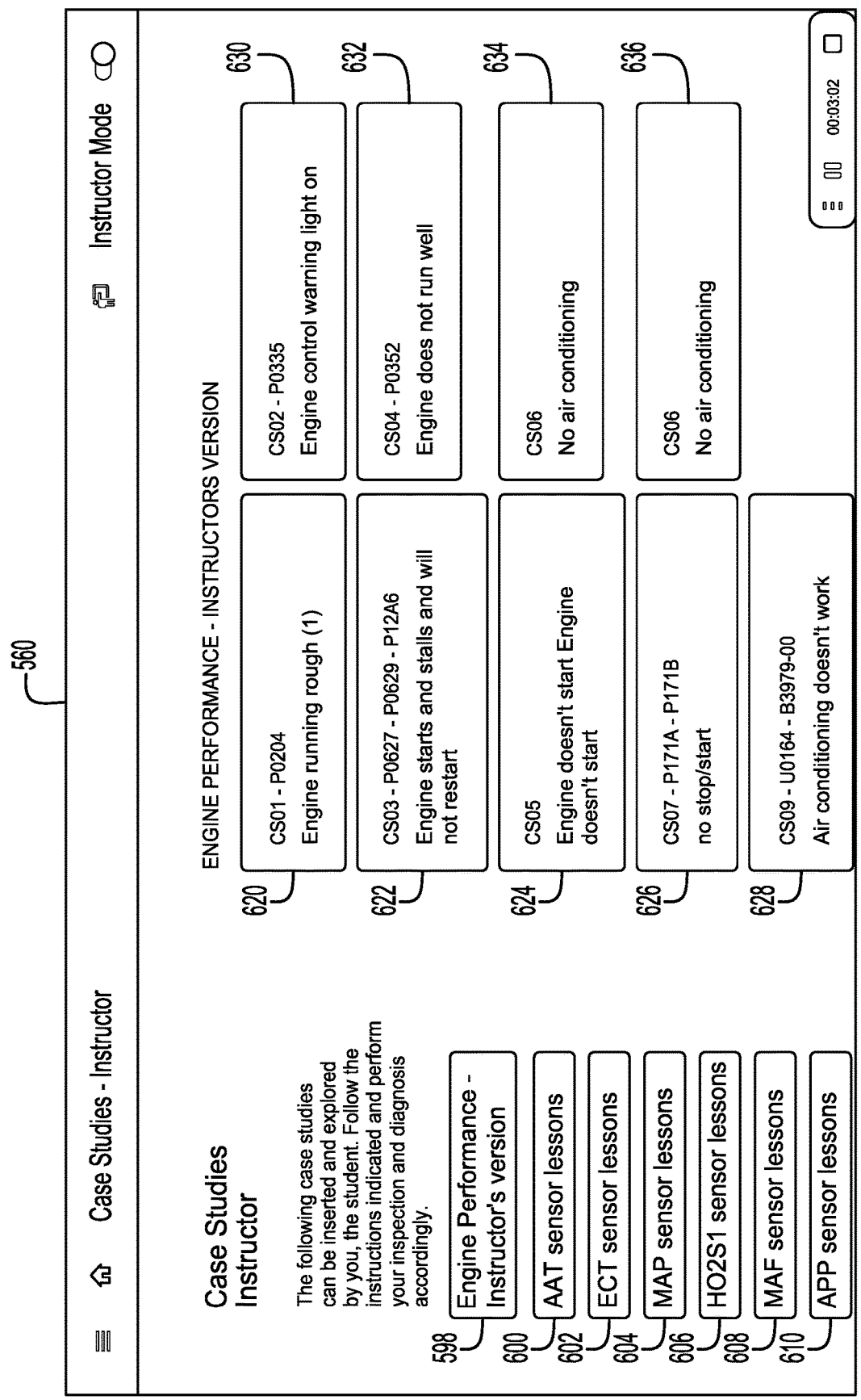
FIG. 17 is a schematic of a case studies instructor GUI utilized in the student training system of FIG. 1 when the student training system is in a teacher operational mode.

Referring to FIGS. 1, 15 and 17, when a teacher selects the case studies instructor command button 232 utilizing the input device 82, the case studies instructor GUI 560 is displayed on the display device 84. The case studies instructor GUI 560 allows a teacher to select one of a plurality of lesson selection buttons and one of a plurality of case study command buttons utilizing the input device 82 wherein each command button is associated with a specific case study. In particular, the case studies instructor GUI 560 includes lesson selection buttons 598, 600, 602, 604, 606, 608, 610. Further, the case studies instructor GUI 560 includes case study command buttons 620, 622, 624, 626, 628, 630, 632, 634, 636 that are each associated with the lesson "Engine Performance Instructor's version." For example, an exemplary case study command button 620 is associated with a case study entitled "CS01-P0204 Engine running rough (1)" that is associated with the lesson entitled "Engine Performance Instructor's version."

Referring to FIGS. 1 and 17-20, when the teacher selects the engine performance instructor's version selection button 598 utilizing the input device 82, the case studies instructors GUI 560 displays the case study command buttons 620, 622, 624, 626, 628, 630, 632, 634, 636. Thereafter, when the teacher selects the case study command button 620 that is associated with a case study entitled "CS01-P0204 engine running rough (1), the GUI 670 associated with the case study entitled "CS01-P0204 engine running rough (1)" is displayed on the display device 84.

Figure 18:
FIG. 18 is a schematic of a case study GUI accessed utilizing the case studies GUI of FIG. 17 when the student training system is in a teacher operational mode.
Figure 21:
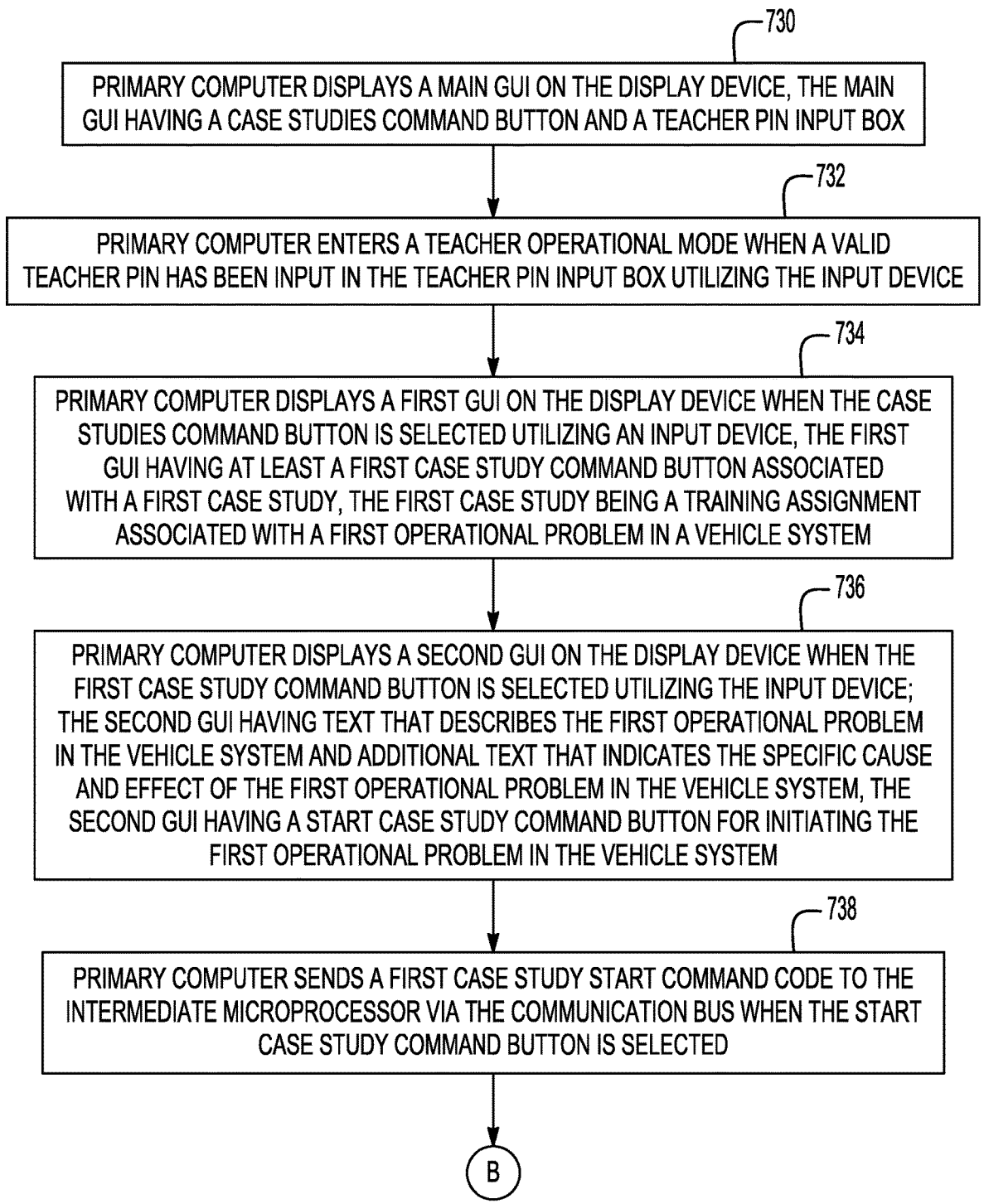
FIGS. 21-22 are flowcharts of a method for utilizing the student training system and the case study GUI of FIGS. 18-20 when the student training system is in a teacher operational mode.
Figure 22:
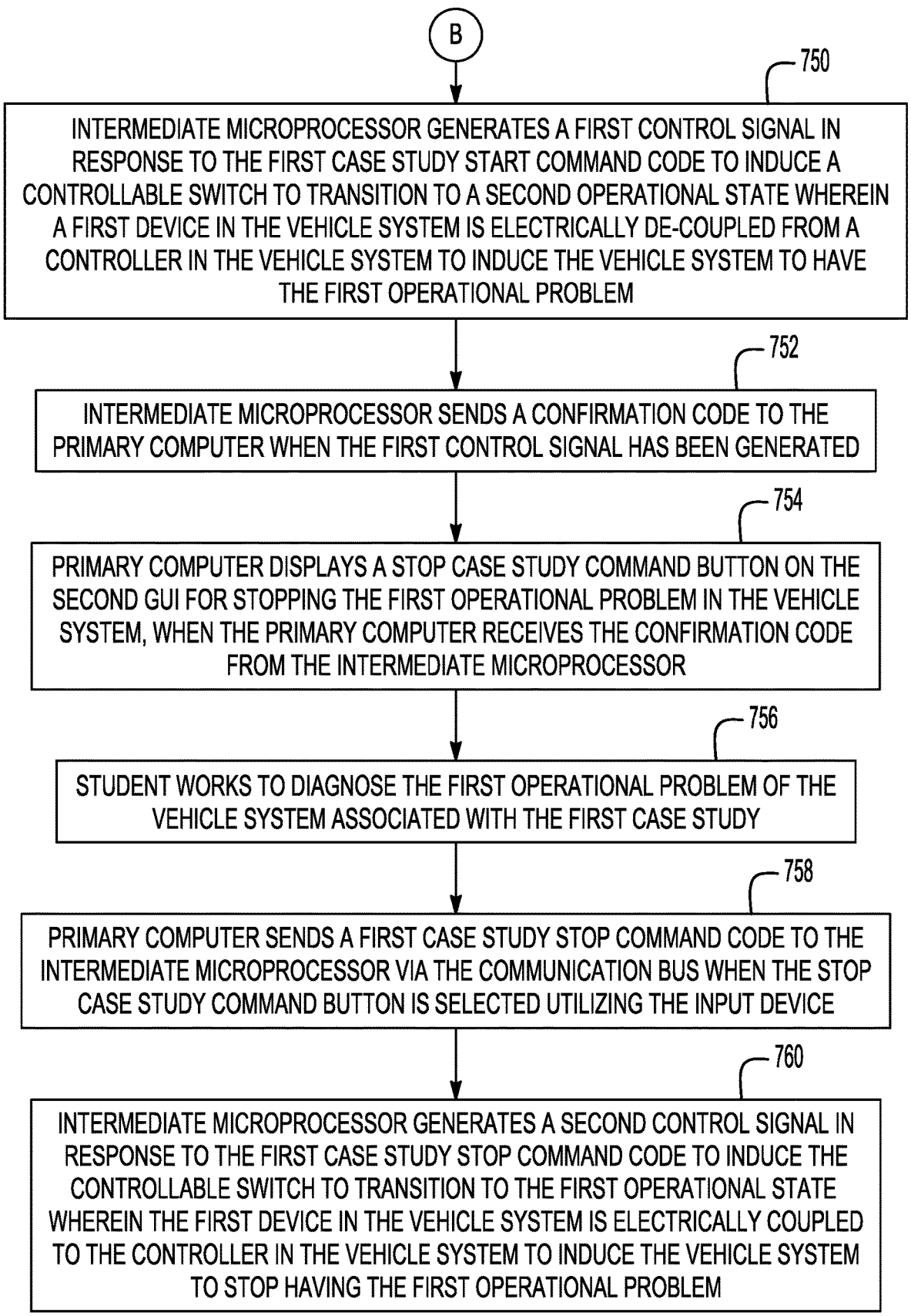

Referring to FIGS. 18-20, the case study GUI 670 includes a start case study command button 672, a first text region 674, a second text region 676, wiring diagrams command button 678, breakout box command button 680, and a stop case study command button 682.

Referring to FIGS. 1 and 18, when a teacher selects the start case study command button 672 utilizing the input device 82, the student training system 20 performs steps to induce the system 22 to have a predetermined operational problem associated with the case study (e.g., case study entitled "CS01-P0204 engine running rough (1)").

The first text region 674 describes the operational problem associated with the vehicle system 22 at a high level but does not disclose the root cause of the operational problem.

The second text region 676 provides some high-level instructions and additional text that indicates the specific cause and effect of the operational problem in the vehicle system 22 so that the teacher fully understands the operational problem and how to diagnose the operational problem.

Referring to FIGS. 1, 8 and 18, when the teacher selects the wiring diagrams command button 678 utilizing the input device 82, the wiring diagrams GUI 330 (shown in FIG. 8) is displayed on the display device 84. The teacher may utilize the wiring schematics displayed on the wiring diagrams GUI 330 in order to better understand how to diagnose the root cause of the operational problem in the vehicle system 22.

Referring to FIGS. 1, 4 and 18, when the teacher selects the breakout box command button 680 utilizing the input device 82, the breakout box GUI 260 (shown in FIG. 4) is displayed on the display device 84. The teacher may utilize the information in the breakout box GUI 260 in order to better understand how to diagnose the root cause of the operational problem in the vehicle system 22.

Referring to FIGS. 1 and 20, after a student has diagnosed the root cause of the operational problem in the vehicle system 22, the teacher selects the stop case study command button 682 utilizing the input device 82, and in response the student training system 20 performs steps to induce the system 22 to not have the predetermined operational problem associated with the case study. In other words, the student training system 20 stops the operational problem in the vehicle system 22.

Referring to FIGS. 1, 14, 15 and 17-22, a flowchart of a method for performing the second case study (e.g., case study entitled "CS01 engine running rough (1)") when the student training system is in the teacher operational mode will be explained. For purposes of simplicity "the term "first case study" in the flowchart refers to the second case study identified above.

At step 730, the primary computer 30 displays a main GUI 200 (shown in FIGS. 14 and 15) on the display device 84. The main GUI 200 having a case studies instructor command button 232 and a teacher pin input box 520 (shown in FIG. 14). After step 730, the method advances to step 732.

At step 732, the primary computer 30 enters a teacher operational mode when a valid teacher pin has been input in the teacher pin input box 520 utilizing the input device 82. After step 732, the method advances to step 734.

At step 734, the primary computer 30 displays a first GUI (e.g., case studies instructor GUI 560 shown in FIG. 17) on the display device 84 when the case studies command button 232 is selected utilizing an input device 82. The first GUI (e.g., case studies instructor GUI 560) having at least a first case study command button (e.g., case study command button entitled "CS01-P0204 Engine running rough (1)") associated with a first case study. The first case study is a training assignment associated with a first operational problem in a vehicle system 22. After step 734, the method advances to step 736.

At step 736, the primary computer 30 displays a second GUI (e.g., case studies instructor GUI 670 shown in FIG. 20) on the display device 84 when the first case study command button 620 is selected utilizing the input device 82. The second GUI (e.g., case studies instructor GUI 670) has text that describes the first operational problem in the vehicle system 22 and additional text that indicates the specific cause and effect of the first operational problem in the vehicle system 22. The second GUI (e.g., case studies instructor GUI 670) has a start case study command button 672 (shown in FIG. 18) for initiating the first operational problem in the vehicle system 22. After step 736, the method advances to step 738.

At step 738, the primary computer 30 sends a first case study start command code to the intermediate microprocessor 100 via the communication bus 50 when the start case study command button 672 is selected. After step 738, the method advances to step 750.

At step 750, the intermediate microprocessor 100 generates a first control signal in response to the first case study start command code to induce a controllable switch 102 to transition to a second operational state wherein a first device (e.g., fuel injector 164) in the vehicle system 22 is electrically de-coupled from a controller 160 in the vehicle system 22 to induce the vehicle system 22 to have the first operational problem. After step 750, the method advances to step 752.

At step 752, the intermediate microprocessor 100 sends a confirmation code to the primary computer 30 when the first control signal has been generated. After step 752, the method advances to step 754.

At step 754, the primary computer 30 displays a stop case study command button 682 on the second GUI (e.g., case studies instructor GUI 670 shown in FIG. 20) for stopping the first operational problem in the vehicle system 22, when the primary computer 30 receives the confirmation code from the intermediate microprocessor 100. After step 754, the method advances to step 756.

At step 756, the student works to diagnose the first operational problem of the vehicle system 22 associated with the first case study. After step 756, the method advances to step 758.

At step 758, the primary computer 30 sends a first case study stop command code to the intermediate microprocessor 100 via the communication bus 50 when the stop case study command button is selected utilizing the input device 82. After step 758, the method advances to step 760.

At step 760, the intermediate microprocessor 100 generates a second control signal in response to the first case study stop command code to induce the controllable switch 102 to transition to the first operational state wherein the first device (e.g., fuel injector 164) in the vehicle system 22 is electrically coupled to the controller 160 in the vehicle system 22 to induce the vehicle system 22 to stop having the first operational problem.

Third Case Study

Referring to FIGS. 14, 15 and 23-26, the GUIs and the operational steps associated with a third case study when the student training system is in a teacher operational mode will now be explained.

Referring to FIGS. 1 and 14, initially a teacher accesses the main GUI 200 which has a teacher pin input box 520 and a key pad menu 522. When the teacher inputs a valid teacher pin code in the teacher pin input box 520 utilizing the input device 82, the main menu 200 is displayed on the display device 84 with additional command buttons being accessible. In particular, the teacher can access the instructors guide command button 230, the case studies instructor command button 232, the wiring diagrams with faults command button 234, and the fault insertion command button 236.

Figure 23:
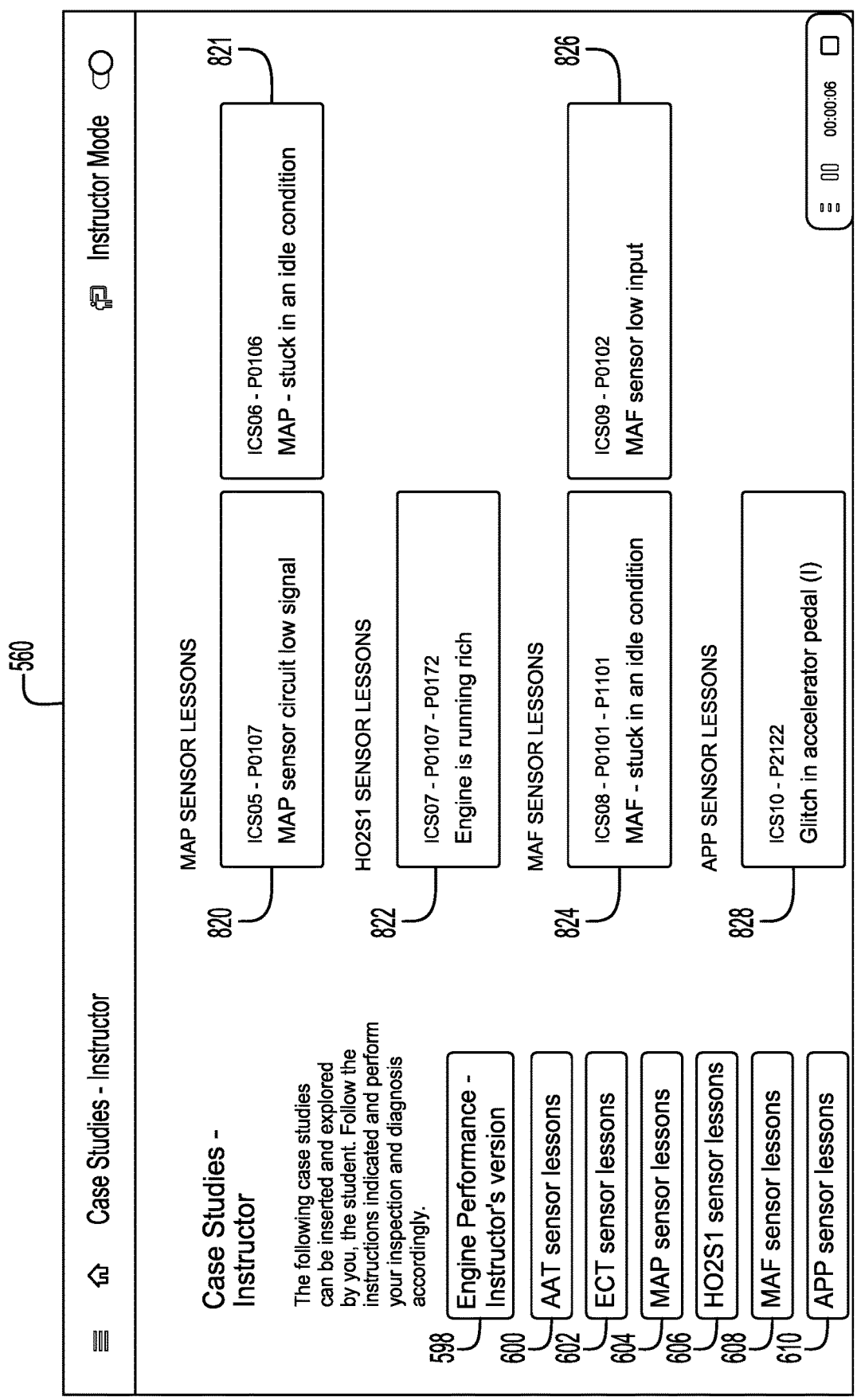
FIG. 23 is a schematic of a case studies GUI utilized in the student training system of FIG. 1 when the student training system is in a teacher operational mode.

Referring to FIGS. 1, 15 and 23, when a teacher selects the case studies instructor command button 232 utilizing the input device 82, the case studies instructor GUI 560 (shown in FIG. 23) is displayed on the display device 84. The case studies instructor GUI 560 allows a teacher to select one of a plurality of lesson selection buttons and one of a plurality of case study command buttons utilizing the input device 82 wherein each command button is associated with a specific case study. In particular, the case studies instructor GUI 560 includes lesson selection buttons 598, 600, 602, 604, 606, 608, 610. Further, the case studies instructor GUI 560 includes case study command buttons 820, 822, 824, 826, 828 that are each associated with the lesson "ICS05-P0107 Map sensor circuit low signal." For example, an exemplary case study command button 820 is associated with a case study entitled "ICS05-P0107 Map sensor circuit low signal" that is further associated with the lesson entitled "MAP sensor lessons."

Referring to FIGS. 1 and 23-26, when the teacher selects the Map sensor lessons selection button 604, the case studies instructors GUI 560 (shown in FIG. 23) displays the case study command buttons 820, 822, 824, 826, 828. Thereafter, when the teacher selects the case study command button 820 that is associated with a case study entitled "ICS05-P0107 Map sensor circuit low signal", the GUI 970 (shown in FIG. 24) associated with the case study that is entitled "ICS05-P0107 Map sensor circuit low signal" is displayed on the display device 84.

Figure 24:
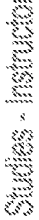
FIG. 24 is a schematic of a case study GUI accessed utilizing the case studies GUI of FIG. 23 when the student training system is in a teacher operational mode.
Figure 26:
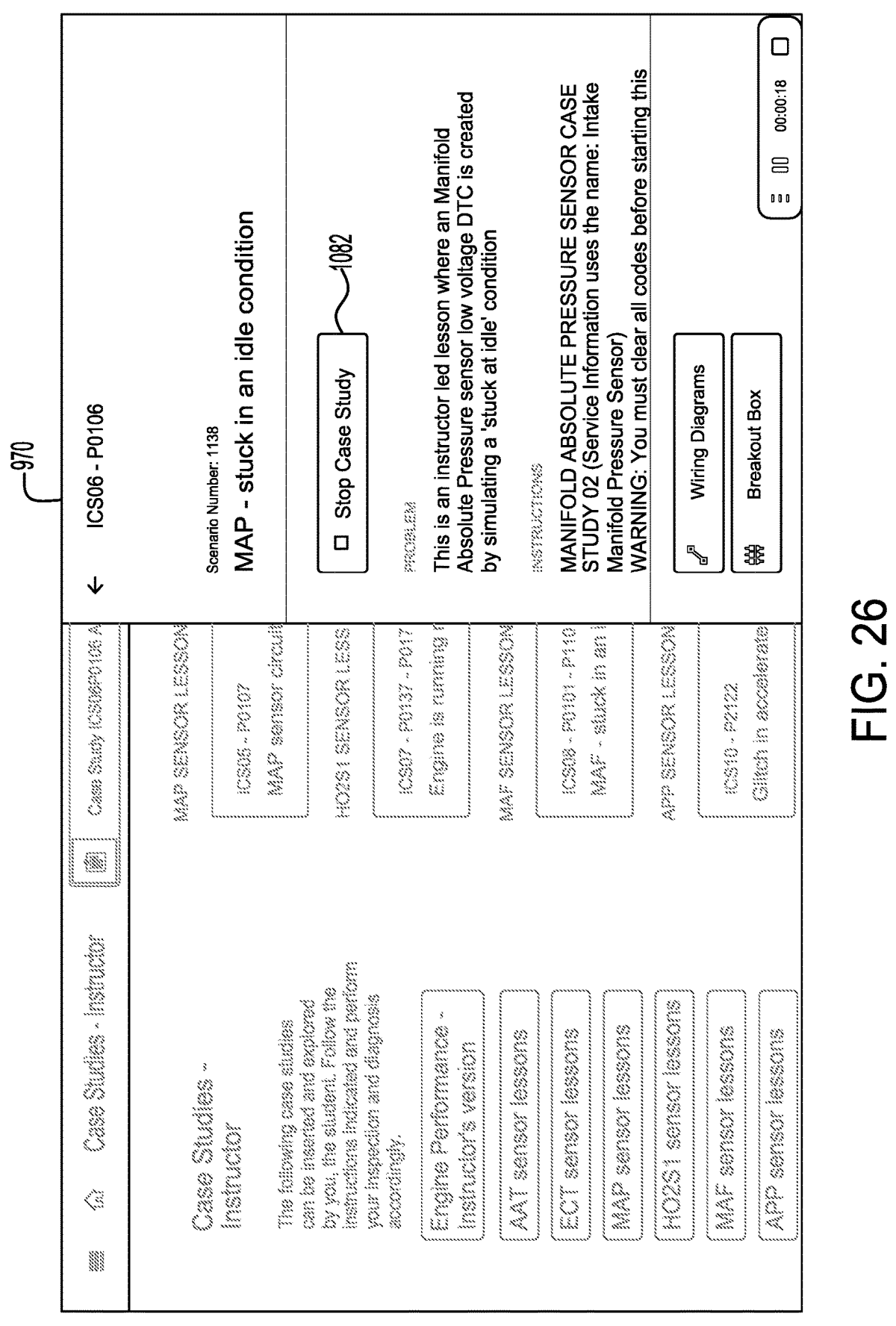
Figure 27:
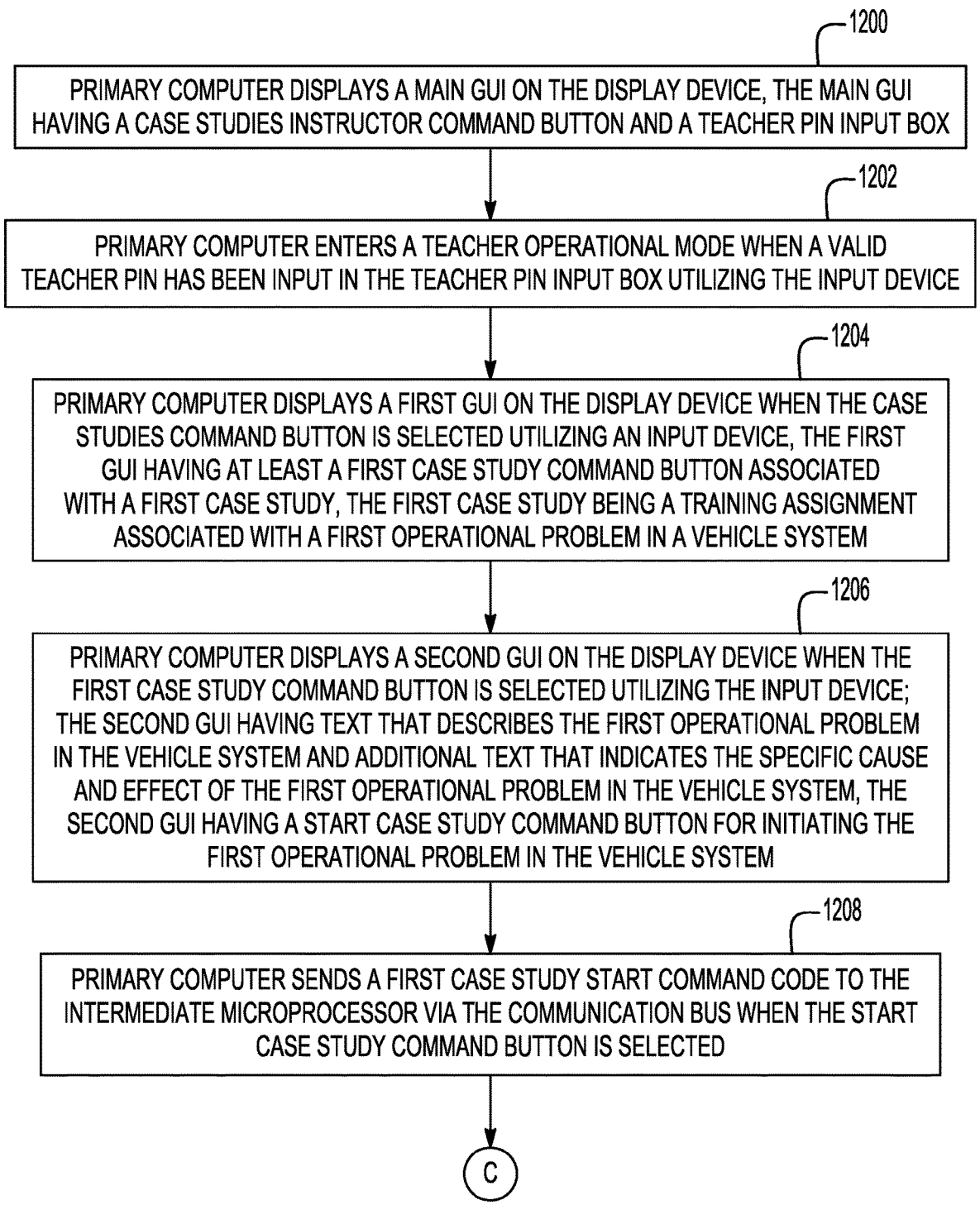
FIGS. 27-28 are flowcharts of a method for utilizing the student training system and the case study GUI of FIGS. 24-26 when the student training system is in a teacher operational mode.
Figure 28:
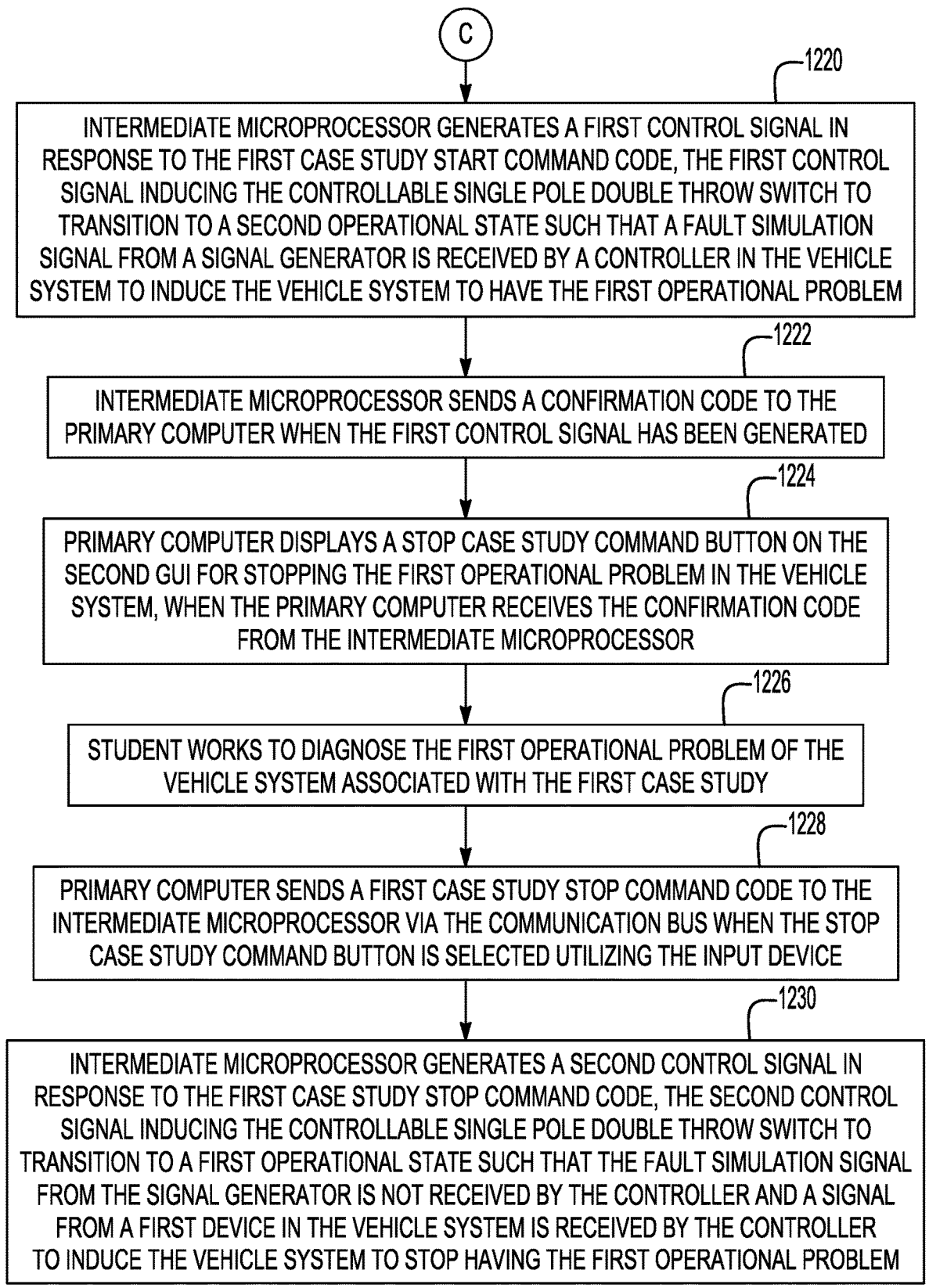
Figure 29:
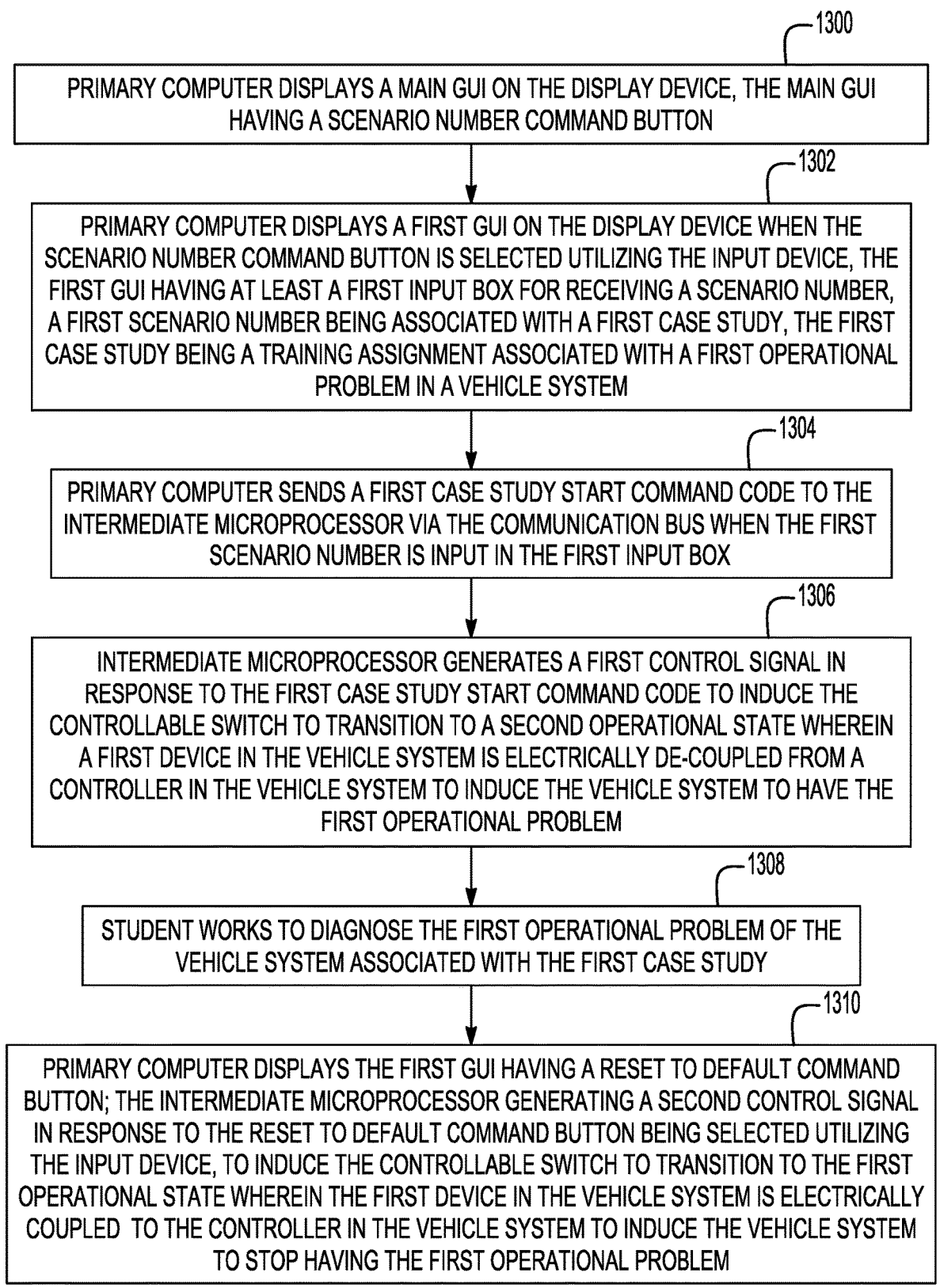
FIG. 29 is a flowchart of a method for utilizing the student training system and the scenario number GUI of FIG. 9 when the student training system is in a student operational mode.

Referring to FIGS. 24-26, the case study GUI 970 includes a start case study command button 972, a first text region 974, a second text region 976, wiring diagrams command button 978, breakout box command button 980, and a stop case study command button 1082 (shown in FIG. 26).

Referring to FIGS. 1 and 24, when a teacher selects the start case study command button 972 utilizing the input device 82, the student training system 20 performs steps to induce the system 22 to have a predetermined operational problem associated with the case study (e.g., case study entitled "ICS05-P0107 Map sensor circuit low signal").

The first text region 974 describes the operational problem associated with the vehicle system 22 at a high level but does not disclose the root cause of the operational problem.

The second text region 976 provides some high-level instructions and additional text that indicates the specific cause and effect of the operational problem in the vehicle system 22 so that the teacher fully understands the operational problem and how to diagnose the operational problem.

Referring to FIGS. 1, 8 and 24, when the teacher selects the wiring diagrams command button 978 utilizing the input device 82, the wiring diagrams GUI 330 (shown in FIG. 8) is displayed on the display device 84. The teacher may utilize the wiring schematics displayed on the wiring diagrams GUI 330 in order to better understand how to diagnose the root cause of the operational problem in the vehicle system 22.

Referring to FIGS. 1, 4 and 24, when the teacher selects the breakout box command button 980 utilizing the input device 82, the breakout box GUI 260 (shown in FIG. 4) is displayed on the display device 84. The teacher may utilize the information in the breakout box GUI 260 in order to better understand how to diagnose the root cause of the operational problem in the vehicle system 22.

Referring to FIGS. 1 and 26, after a student has diagnosed the root cause of the operational problem in the vehicle system 22, the teacher selects the stop case study command button 1082 utilizing the input device 82, and in response the student training system 20 performs steps to induce the system 22 to not have the predetermined operational problem associated with the case study. In other words, the student training system 20 stops the operational problem in the vehicle system 22.

Referring to FIGS. 1, 14, 15 and 23-28, a flowchart of a method for performing the third case study (e.g., case study entitled "ICS05-P0107 Map sensor circuit low signal") when the student training system is in the teacher operational mode will be explained. For purposes of simplicity "the term "first case study" in the immediately following flowchart refers to the third case study identified above.

At step 1200, the primary computer 30 displays a main GUI 200 (shown in FIGS. 14 and 15) on the display device 84. The main GUI 200 has a case studies instructor command button 232 and a teacher pin input box 520. After step 1200, the method advances to step 1202.

At step 1202, the primary computer 30 enters a teacher operational mode when a valid teacher pin has been input in the teacher pin input box 520 utilizing the input device 82. After step 1202, the method advances to step 1204.

At step 1204, the primary computer 30 displays a first GUI (e.g., case studies instructor GUI 560 shown in FIG. 23) on the display device 84 when the case studies command button 232 (shown in FIG. 15) is selected utilizing an input device 82. The first GUI (e.g., case studies instructor GUI 560) has at least a first case study command button (e.g., ICS05-P0107 Map sensor circuit low signal command button 820) associated with a first case study (e.g., ICS05-P0107 Map sensor circuit low signal). The first case study is a training assignment associated with a first operational problem in a vehicle system 22. After step 1204, the method advances to step 1206.

At step 1206, the primary computer 30 displays a second GUI (e.g., GUI 970 shown in FIG. 24) on the display device 84 when the first case study command button is selected utilizing the input device 82. The second GUI (e.g., GUI 970) has text that describes the first operational problem in the vehicle system 22 and additional text that indicates the specific cause and effect of the first operational problem in the vehicle system 22. The second GUI (e.g., GUI 970) has a start case study command button 972 for initiating the first operational problem in the vehicle system 22. After step 1206, the method advances to step 1208.

At step 1208, the primary computer 30 sends a first case study start command code to the intermediate microprocessor 100 via the communication bus 50 when the start case study command button 972 (shown in FIG. 24) is selected. After step 1208, the method advances to step 1220.

At step 1220, the intermediate microprocessor 100 generates a first control signal in response to the first case study start command code. The first control signal induces the controllable single pole double throw switch 104 to transition to a second operational state such that a fault simulation signal from a signal generator 106 is received by a controller 160 in the vehicle system 22 to induce the vehicle system 22 to have the first operational problem. After step 1220, the method advances to step 1222.

At step 1222, the intermediate microprocessor 100 sends a confirmation code to the primary computer 30 when the first control signal has been generated. After step 1222, the method advances to step 1224.

At step 1224, the primary computer 30 displays a stop case study command button on the second GUI for stopping the first operational problem in the vehicle system 22, when the primary computer 30 receives the confirmation code from the intermediate microprocessor 100. After step 1224, the method advances to step 1226.

At step 1226, the student works to diagnose the first operational problem of the vehicle system 22 associated with the first case study. After step 1226, the method advances to step 1228.

At step 1228, the primary computer 30 sends a first case study stop command code to the intermediate microprocessor 100 via the communication bus 50 when the stop case study command button is selected utilizing the input device 82. After step 1228, the method advances to step 1230.

At step 1230, the intermediate microprocessor 100 generates a second control signal in response to the first case study stop command code. The second control signal induces the controllable single pole double throw switch 104 to transition to a first operational state such that the fault simulation signal from the signal generator 106 is not received by the controller 160 and a signal from a first device (e.g., manifold absolute pressure sensor 166) in the vehicle system 22 is received by the controller 106 to induce the vehicle system 22 to stop having the first operational problem.

Fourth Case Study

Referring to FIGS. 1, 2 and 9, when the user selects the scenario number command button 224 utilizing the input device 82, the scenario number GUI 340 is displayed on the display device 84. The scenario number GUI 340 includes an input box 342 and a reset to defaults command button 344. When the user inputs a scenario number (which corresponds to a case study that is not known by the user) in the input box 342, utilizing the input device 82, the student training system 20 initiates a case study associated with the scenario number. When the user selects the reset to defaults command button 344 utilizing the input device 82, the student training system 20 exits the case study associated with the scenario number.

Referring to FIGS. 1, 2, 9 and 29, a flowchart of a method for performing the fourth case study when the student training system 20 is in the student operational mode will be explained. For purposes of simplicity "the term "first case study" in the immediately following flowchart refers to a fourth case study.

At step 1300, the primary computer 30 displays a main GUI 200 (shown in FIG. 2) on the display device 84. The main GUI 200 pounds a scenario number command button 224. After step 1300, the method advances to step 1302.

At step 1302, the primary computer 30 displays a first GUI (e.g., scenario number GUI 340 shown in FIG. 9) on the display device 84 when the scenario number command button 224 is selected utilizing the input device 82. The first GUI (e.g., scenario number GUI 340) has at least a first input box 342 for receiving a scenario number. A first scenario number is associated with a first case study. The first case study is a training assignment associated with a first operational problem in a vehicle system 22. After step 1302, the method advances to step 1304.

At step 1304, the primary computer 30 sends a first case study start command code to the intermediate microprocessor 100 via the communication bus 50 when the first scenario number is input in the first input box 342. After step 1304, method advances to step 1306.

At step 1306, the intermediate microprocessor 100 generates a first control signal in response to the first case study start command code to induce the controllable switch 102 to transition to a second operational state wherein a first device (e.g., fuel injector 164 shown in FIG. 1) in the vehicle system 22 is electrically de-coupled from a controller 160 in the vehicle system 22 to induce the vehicle system 22 to have the first operational problem. After step 1306, the method advances to step 1308.

At step 1308, the student works to diagnose the first operational problem of the vehicle system 22 associated with the first case study. After step 1308, the method advances to step 1310.

At step 1310, the primary computer 30 displays the first GUI (scenario number GUI 1340) having a reset to default command button 344. The intermediate microprocessor 100 generating a second control signal in response to the reset to default command button 344 being selected utilizing the input device 82, to induce the controllable switch 102 to transition to the first operational state wherein the first device (e.g., fuel injector 164 shown in FIG. 1) in the vehicle system 22 is electrically coupled to the controller 160 in the vehicle system 22 to induce the vehicle system 22 to stop having the first operational problem.

The student training system described herein provides a substantial advantage over other systems. In particular, the student training system has case studies that teachers and students utilize to automatically set up operational problems in a vehicle system to allow students to diagnose the operational problems. The student training system not only instructs the students, but also allows relatively inexperienced teachers to enhance their knowledge and instructional capabilities regarding diagnosing vehicle systems.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Further, the term "when" in the claims, flowcharts, and detailed description herein can be replaced by the term "in response to." Additionally, while various embodiments of the claimed invention have been described, it is to be understood that aspects of the invention may include only some of the described embodiments. Accordingly, the claimed invention is not to be seen as limited by the foregoing description.

What is claimed is:

1. A student training system for a vehicle system, comprising:
a primary computer having a display device and an input device,
an intermediate microprocessor operably communicating with the primary computer utilizing a communication bus; the intermediate microprocessor being operably coupled to a controllable switch; the controllable switch having first and second terminals, the first terminal being electrically coupled to a controller in the vehicle system, the second terminal being electrically coupled to a first device in the vehicle system; the controllable switch having a first operational state wherein the first device is electrically coupled to the controller, and a second operational state wherein the first device is electrically de-coupled from the controller;
the primary computer displaying a first GUI on the display device, the first GUI having at least a first case study command button associated with a first case study, the first case study being a training assignment associated with a first operational problem in the vehicle system;
the primary computer displaying a second GUI on the display device when the first case study command button is selected utilizing the input device; the second GUI having text that describes the first operational problem in the vehicle system, the second GUI having a start case study command button for initiating the first operational problem in the vehicle system;
the primary computer sending a first case study start command code to the intermediate microprocessor via the communication bus when the start case study command button is selected; and
the intermediate microprocessor generating a first control signal in response to the first case study start command code to induce the controllable switch to transition to the second operational state wherein the first device is electrically de-coupled from the controller to induce the vehicle system to have the first operational problem.

2. The student training system of claim 1, wherein:
the intermediate microprocessor sending a confirmation code to the primary computer when the first control signal has been generated.

3. The student training system of claim 2, wherein:
the primary computer displaying a stop case study command button on the second GUI for stopping the first operational problem in the vehicle system, when the primary computer receives the confirmation code from the intermediate microprocessor.

4. The student training system of claim 3, wherein:
the primary computer sending a first case study stop command code to the intermediate microprocessor via the communication bus when the stop case study command button is selected utilizing the input device; and
the intermediate microprocessor generating a second control signal in response to the first case study stop command code to induce the controllable switch to transition to the first operational state wherein the first device is electrically coupled to the controller to induce the vehicle system to stop having the first operational problem.

5. The student training system of claim 1, wherein:
the primary computer displaying a teacher pin input box for receiving a teacher password for entering a teacher operational mode; and the second GUI having additional text that indicates the specific cause and effect of the first operational problem in the vehicle system when the primary computer is in the teacher operational mode.

6. The student training system of claim 1, wherein:
a fuel injector being the first device, the controllable switch having the second operational state that simulates an open circuit between the controller and the fuel injector.

7. A student training system for a vehicle system, comprising:
a primary computer having a display device and an input device;
an intermediate microprocessor operably communicating with the primary computer utilizing a communication bus; the intermediate microprocessor being operably coupled to a controllable single pole double throw switch; the controllable single pole double throw switch having first, second, and third terminals, the first terminal being electrically coupled to a controller in the vehicle system, the second terminal being electrically coupled to a first device in the vehicle system, the third terminal being electrically coupled to a signal generator; the controllable single pole double throw switch having a first operational state wherein the first electrical terminal is electrically coupled to the second terminal, the controllable single pole double throw switch having a second operational state wherein the first electrical terminal is electrically coupled to the third terminal;
the primary computer displaying a first GUI on the display device, the first GUI having at least a first case study command button associated with a first case study, the first case study being a training assignment associated with a first operational problem in the vehicle system;
the primary computer displaying a second GUI on the display device when the first case study command button is selected utilizing the input device; the second GUI having text that describes the first operational problem in the vehicle system, the second GUI having a start case study command button for initiating the first operational problem in the vehicle system;
the primary computer sending a first case study start command code to the intermediate microprocessor via the communication bus when the start case study command button is selected; and
the intermediate microprocessor generating a first control signal in response to the first case study start command code, the first control signal inducing the controllable single pole double throw switch to transition to the second operational state such that a fault simulation signal from the signal generator is received by the controller to induce the vehicle system to have the first operational problem.

8. The student training system of claim 7, wherein:
the intermediate microprocessor sending a confirmation code to the primary computer when the first control signal has been generated.

9. The student training system of claim 8, wherein:
the primary computer displaying a stop case study command button on the second GUI for stopping the first operational problem in the vehicle system, when the primary computer receives the confirmation code from the intermediate microprocessor.

10. The student training system of claim 9, wherein:
the primary computer sending a first case study stop command code to the intermediate microprocessor via the communication bus when the stop case study command button is selected utilizing the input device; and
the intermediate microprocessor generating a second control signal in response to the first case study stop command code, the second control signal inducing the controllable single pole double throw switch to transition to the first operational state such that the fault simulation signal from the signal generator is not received by the controller, and the first device is electrically coupled to the controller, to induce the vehicle system to stop having the first operational problem.

11. The student training system of claim 7, wherein:
the primary computer displaying a teacher pin input box for receiving a teacher password for entering a teacher operational mode; and
the second GUI having additional text that indicates the specific cause and effect of the first operational problem in the vehicle system when the primary computer is in the teacher operational mode.

12. The student training system of claim 7, wherein:
the controllable single pole double throw switch having the second operational state to transmit the fault simulation signal to simulate a malfunctioning manifold absolute pressure sensor in the vehicle system.

13. A student training system for a vehicle system, comprising:
a primary computer having a display device and an input device,
an intermediate microprocessor operably communicating with the primary computer utilizing a communication bus; the intermediate microprocessor being operably coupled to a controllable switch; the controllable switch having first and second terminals, the first terminal being electrically coupled to a controller in the vehicle system, the second terminal being electrically coupled to a first device in the vehicle system; the controllable switch having a first operational state wherein the first device is electrically coupled to the controller, and a second operational state wherein the first device is electrically de-coupled from the controller;
the primary computer displaying a first GUI on the display device, the first GUI having at least a first input box for receiving a scenario number, a first scenario number being associated with a first case study, the first case study being a training assignment associated with a first operational problem in the vehicle system;
the primary computer sending a first case study start command code to the intermediate microprocessor via the communication bus when the first scenario number is input in the first input box; and
the intermediate microprocessor generating a first control signal in response to the first case study start command code to induce the controllable switch to transition to the second operational state wherein the first device is electrically de-coupled from the controller to induce the vehicle system to have the first operational problem.

14. The student training system of claim 13, wherein:
the first GUI having a reset to default command button; the intermediate microprocessor generating a second control signal in response to the reset to default command button being selected to induce the controllable switch to transition to the first operational state wherein the first device is electrically coupled to the controller to induce the vehicle system to stop having the first operational problem.

15. The student training system of claim 13, wherein:
a fuel injector being the first device, the controllable switch having the second operational state that simulates an open circuit between the controller and the fuel injector.

* * * * *